United States Patent
McQuillan et al.

(10) Patent No.: US 9,683,864 B2
(45) Date of Patent: Jun. 20, 2017

(54) SYSTEM FOR PROVIDING AIRCRAFT LANDING INSTRUCTIONS

(71) Applicant: 168 Productions, LLC, Waconia, MN (US)

(72) Inventors: Benjamin P. McQuillan, Waconia, MN (US); William Jansen, Eden Prairie, MN (US); Mark A. Christenson, Eagan, MN (US)

(73) Assignee: 168 Productions, LLC, Waconia, MN (US)

(*) Notice: Subject to any disclaimer, the term of this patent is extended or adjusted under 35 U.S.C. 154(b) by 0 days.

(21) Appl. No.: 15/049,576

(22) Filed: Feb. 22, 2016

(65) Prior Publication Data

US 2016/0245666 A1    Aug. 25, 2016

Related U.S. Application Data

(60) Provisional application No. 62/120,080, filed on Feb. 24, 2015.

(51) Int. Cl.
   *G01C 23/00* (2006.01)
(52) U.S. Cl.
   CPC .................. *G01C 23/005* (2013.01)
(58) Field of Classification Search
   CPC .................. G05D 1/08; G06F 19/00
   See application file for complete search history.

(56) References Cited

U.S. PATENT DOCUMENTS

| 5,714,948 A * | 2/1998 | Farmakis | B60R 25/1025 |
| | | | 340/961 |
| 7,006,032 B2 * | 2/2006 | King | G01S 3/023 |
| | | | 342/29 |

(Continued)

OTHER PUBLICATIONS

"Pilots Handbook of Aeronautical Knowledge," U.S. Department of Transportation Federal Aviation Administration, handbook FAA-H-8083-25A, 2007, published by the United States Department of Transportation, Federal Aviation Administration, Airman Testing Standards Branch, AFS-630, P.O. Box 25082, Oklahoma City, OK 73125.

(Continued)

*Primary Examiner* — Adam Tissot
*Assistant Examiner* — Alex C Dunn
(74) *Attorney, Agent, or Firm* — Kelly, Holt & Christenson, PLLC

(57) ABSTRACT

A system for providing aircraft landing instructions is provided. The system comprises a memory component configured to store specifications for an aircraft. The system also comprises a controller configured to operate in either of a first mode or a second mode, wherein the first mode comprises a fly-along mode, and wherein the second mode comprises an emergency mode. In the fly-along mode, the controller is configured to generate, based on a received operator indication of a destination, a map, wherein the map comprises at least an indication of a current location of the aircraft and a destination indication. In the emergency mode, the controller is configured to generate a series of instructions for controlling and landing the aircraft, wherein the series of instructions are generated at least in part based on the stored specifications for the aircraft. The system also comprises a presentation component configured to provide the generated series of instructions to an operator of the aircraft.

18 Claims, 32 Drawing Sheets

(56) References Cited

U.S. PATENT DOCUMENTS

| | | | | |
|---|---|---|---|---|
| 7,689,328 | B2* | 3/2010 | Spinelli | G01C 21/20 340/945 |
| 8,090,526 | B2* | 1/2012 | Marty | G01C 21/00 701/3 |
| 8,521,340 | B2* | 8/2013 | Coulmeau | G08G 5/0039 340/945 |
| 9,052,198 | B2* | 6/2015 | Louise-Babando | G01C 23/00 |
| 9,174,725 | B2* | 11/2015 | Porez | G05B 15/02 |
| 9,257,048 | B1* | 2/2016 | Offer | G08G 5/0021 |
| 9,280,904 | B2* | 3/2016 | Bourret | G08G 5/0013 |
| 9,310,222 | B1* | 4/2016 | Suiter | G01C 23/005 |
| 2011/0264312 | A1* | 10/2011 | Spinelli | G08G 5/0021 701/16 |
| 2012/0191273 | A1* | 7/2012 | Jacobs | H04B 7/18508 701/3 |
| 2013/0179011 | A1* | 7/2013 | Colby | G01C 21/20 701/16 |
| 2014/0027565 | A1* | 1/2014 | Marvin | B64C 27/57 244/17.13 |
| 2015/0153740 | A1* | 6/2015 | Ben-Shachar | G05D 1/0676 701/16 |

OTHER PUBLICATIONS

"Airplane Flying Handbook," U.S. Department of Transportation Federal Aviation Administration, handbook FAA-H-8083-3A, 2004, published by the United States Department of Transportation, Federal Aviation Administration, Airman Testing Standards Branch, AFS-630, P.O. Box 25082, Oklahoma City, OK 73125.

"Aeronautical Information Manual Official Guide to Basic Flight Information and ATC Procedures," U.S. Department of Transportation Federal Aviation Administration, manual, Dec. 10, 2015.

"Part 91—General Operating and Flight Rules," 14 C.F.R. 91, vol. 2.

"Part 61—Certffication: Pilots, Flight Instructors, and Ground Instructors," 14 C.F.R. 61, vol. 2.

* cited by examiner

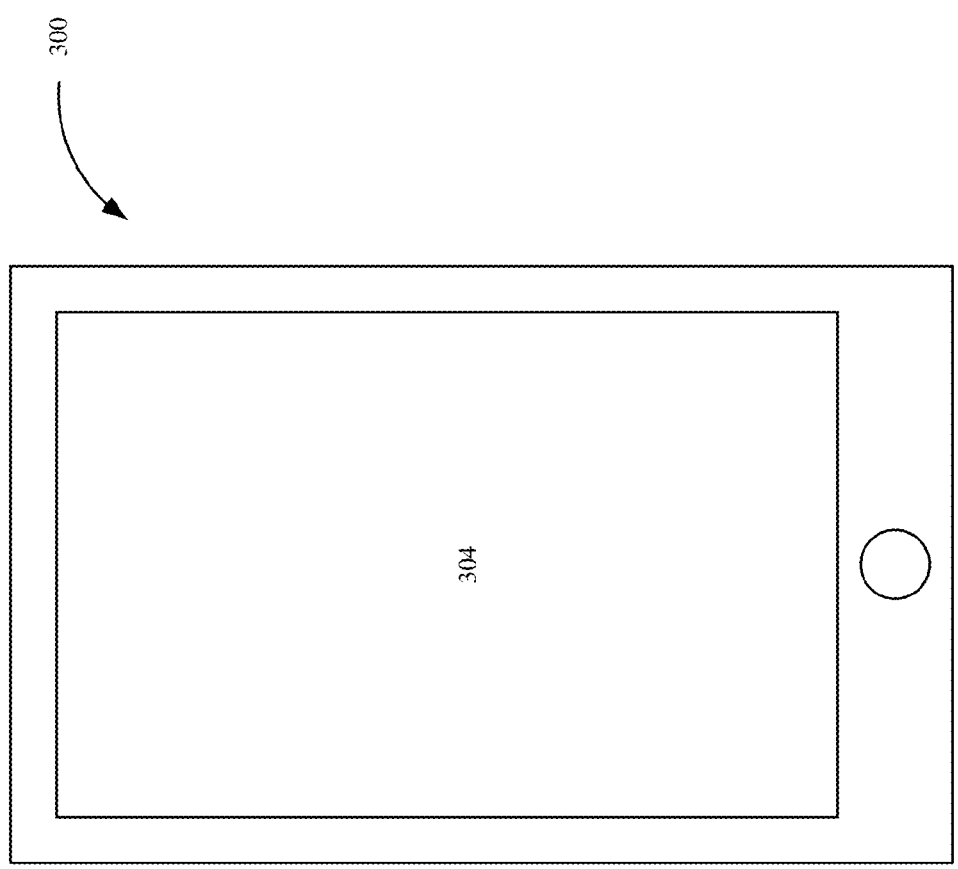

SYSTEM FOR PROVIDING AIRCRAFT LANDING INSTRUCTIONS

CROSS-REFERENCE TO RELATED APPLICATIONS

The present application is based on and claims the benefit of U.S. Provisional Patent Application Ser. No. 62/120,080 filed Feb. 24, 2015, the contents of which is hereby incorporated by reference in its entirety.

BACKGROUND

Human flight is an everyday occurrence in modern life. At any given moment, roughly 5,000 aircrafts fly above the United States alone, amounting to an estimated 64 million commercial and private take-offs every year. With an increase in the number of flights, the chance of a pilot becoming incapacitated during one of those flight also increases.

Many aircraft flying above the United States are privately-owned, accommodating only a handful of passengers and a pilot, or even just a pilot and a single passenger. For such pilots, and their passengers, many manufacturers provide emergency landing devices, such that, should a pilot become incapacitated, the occupants can survive the incident. For example, some aircrafts are equipped with one or more parachutes.

SUMMARY

A system for providing aircraft landing instructions is provided. The system comprises a memory component configured to store aircraft specifications for an aircraft. The system also comprises a controller configured to operate in either of a first mode or a second mode, wherein the first mode comprises a fly-along mode, and wherein the second mode comprises an emergency mode. In the fly-along mode, the controller is configured to generate, based on a received operator indication of a destination, a map, wherein the map comprises at least an indication of a current location of the aircraft and a destination indication. In the emergency mode, the controller is configured to generate a series of instructions for controlling and landing the aircraft, wherein the series of instructions are generated at least in part based on the stored specifications for the aircraft. The system also comprises a presentation component configured to provide the generated series of instructions to an operator of the aircraft.

BRIEF DESCRIPTION OF THE DRAWINGS

FIGS. 3A-3C illustrate example embodiments of a computing device configured to host a system for providing landing instructions in accordance with some embodiments of the present invention.

DETAILED DESCRIPTION OF ILLUSTRATIVE EMBODIMENTS

Figure 1:
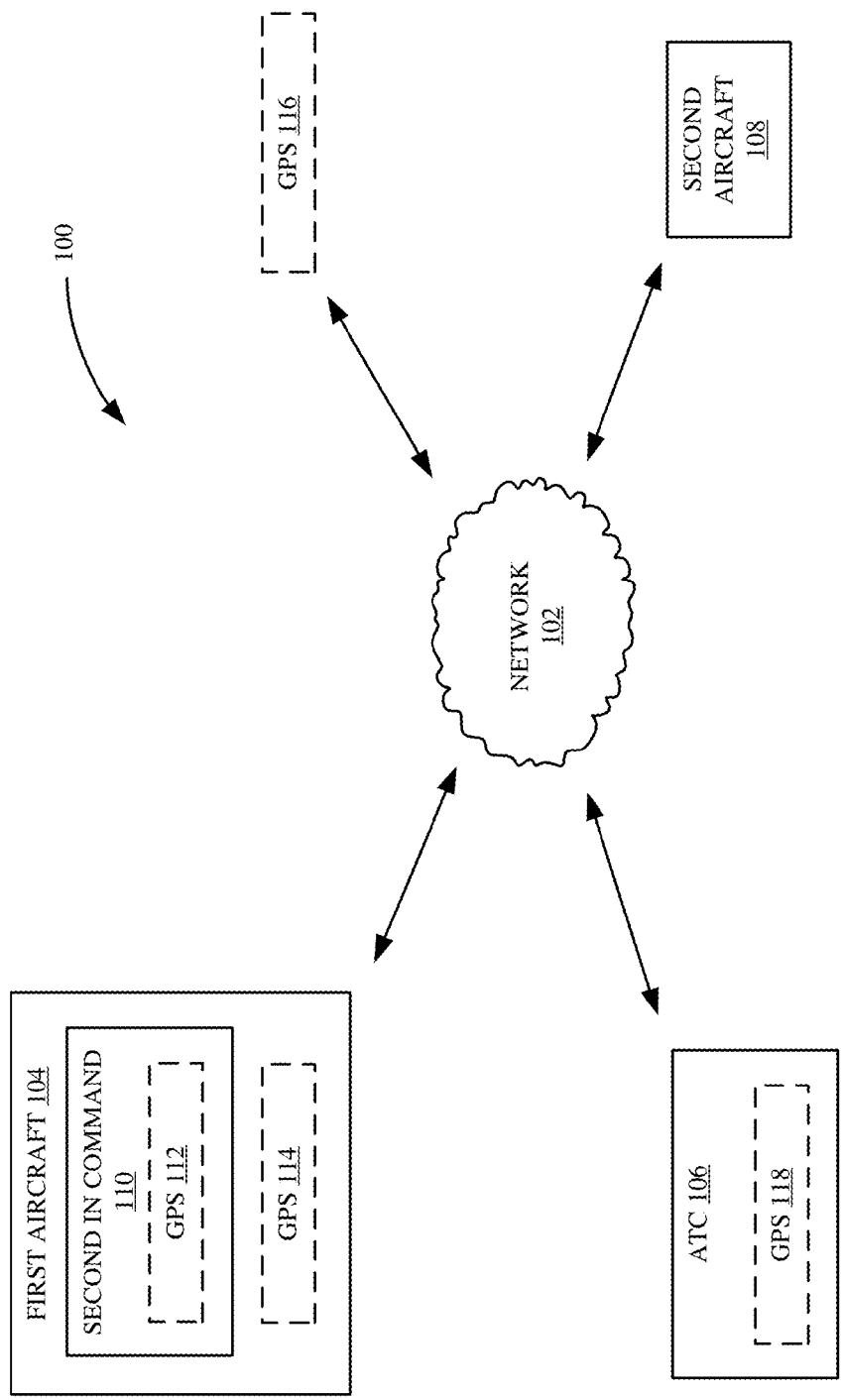
FIG. 1 illustrates an example system for providing landing instructions for an aircraft in accordance with one embodiment of the present invention.

Multiple aircraft fly within a given airspace at a given time. Some are commercial aircraft, equipped with backup systems and safety procedures. Some are smaller crafts, configured to be purchased and flown by an individual pilot. It is important for all aircraft to be in communication in order to prevent collisions, for example direct communication with each other, or through an intermediary, for example, through an air traffic controller.

For small aircraft pilots, the presence of additional safety measures in an aircraft can be an attractive selling feature. For example, some small aircraft come equipped with a parachute system, or are configured to allow for aftermarket installation of a parachute system. In the event a pilot is incapacitated, some aircraft are manufactured such that the pilot and the passenger can use a parachute system to safely eject from the craft. However, this does require that a passenger is able to access and deploy the parachute both for themselves and an incapacitated pilot. In a tense emergency scenario, this may prove difficult for an unexperienced passenger.

A system that facilitates a passenger taking over the controls of an aircraft in an emergency is desired. The system, in one embodiment, facilitates the passenger and the pilot getting safely back to ground, either by using a parachute system, or by finding an airport and landing successfully. Such a system may not be intended to replace a pilot in normal flight scenarios, only to facilitate a non-trained passenger, for example the pilot's spouse, friend, or other passenger, to get the craft close enough to the ground during an emergency landing such that any occupants can survive an emergency landing. In at least some instances, an aircraft may be totaled, or significantly damaged after such a landing. The system may be designed, in one embodiment, with higher tolerances for altitude or flight deviations than would be allowed for a trained pilot. However, system tolerances may be such that a non-trained pilot can safely get the craft close enough to the ground that all occupants can survive the landing.

A system is also desired to provide a passenger, for example a pilot's spouse, children, or other non-pilot passengers, with some sense of security during regular flights. Having such a system available within an aircraft, and having familiarity with the system may provide knowledge that, should the pilot become incapacitated, the passenger can get themselves and the pilot safely back to the ground. In one embodiment, the system may be equipped with a training module, such that a frequent passenger (for example, a pilot's spouse or friend) can gain familiarity with an aircraft, and with the aircraft control systems. Additionally, in one embodiment, the system facilitates a passenger following-along a flight path. Such confidence-related and engagement-related aspects of the system may make it easier for a passenger to take over in the event of a pilot emergency.

Another important goal of the system, in one embodiment, is to ensure that air traffic control (ATC), other pilots in the area, and any other relevant emergency personnel are aware of an ongoing emergency. ATC may act as an intermediary between the passenger and local emergency personnel, ensuring that, upon landing, that appropriate rescue services are available. Additionally, ATC may also help to ensure that other aircrafts in nearby airspace give the distressed aircraft sufficient space to navigate an emergency landing. ATC may also provide up-to-date information and assistance in landing the aircraft. The system may, in one embodiment, be configured to walk the passenger through the steps necessary in contacting ATC.

FIG. 1 illustrates an example system for providing landing instructions for an aircraft in accordance with one embodiment of the present invention. An aircraft may operate within an environment 100 comprising a communication network 102, a first aircraft 104, ATC 106, and a second aircraft 108. Network 102 may comprise a voice radio, configured to use high frequency bands for line of sight communication, or high frequency bands for long distance communication. Network 102 may also facilitate communication using other wireless techniques, for example, using the Internet, other wireless communication services, etc. Network 102 may also comprise controller pilot data link communications, wide area networks, local area networks that may include one or servers, networks, or databases, and may use a particular communication protocol to facilitate transfer of data between the entities included in environment 100.

According to one embodiment, first aircraft 104 may include a system for providing landing instructions 110. System 110 may be configured, in the event of an emergency, such as incapacitation of the pilot of aircraft 104, to facilitate guidance of a non-pilot user to safely land aircraft 104. System 110 may comprise, in one embodiment, a comprehensive training and coaching system configured to provide initial and recurrent training to the non-pilot user on an as-need or as-wanted basis. In one embodiment, system 110 also facilitates landing of aircraft 104 in an emergency scenario by detecting aircraft specifications and providing instructions to the non-pilot user as landing progress is detected. System 110 may also allow the non-pilot user to follow along during any flight, for example in order to stay familiar with functionality and interface of system 110 as well as the control systems of the aircraft.

In one embodiment, system 110 comprises an emergency mode configured to present a step-by-step sequence of instructions to the non-pilot user, coaching the user in performing the tasks required to take control of, and land, aircraft 104 safely. Such tasks can include, but are not limited to: controlling in autopilot, controlling engine power, controlling basic flight controls, changing course (and other basic navigation techniques), climbing, descending, managing speed, changing aircraft configuration, shutting down the aircraft, deploying an emergency ballistic recovery system, navigating to an airport, identifying an airport, controlling aircraft communication systems, and establishing two-way communications with ATC 106, second aircraft 108, or other aircrafts in nearby airspace (not shown in FIG. 1).

In one embodiment, the provided instructions are scripted and presented visually to the user as the user completes each of the tasks in the step-by-step sequence. In another embodiment, at least some of the instructions are pre-recorded, such that they can be presented to the user through an audio component of system 110. In one embodiment, some or all of the instructions are presented as a result of user inputs, or triggers, coming from external navigation (e.g., ATC 106) or from internal systems within aircraft 104 (not shown in FIG. 1) included within the first aircraft 104. In one embodiment, system 110 is configured to detect when a step in the instruction sequence is completed, and automatically presents the next step in the sequence. For at least some steps, in some embodiments, however, at least some input must be received by the user in order to move the sequence forward.

System 110 may be deployed, in one embodiment, on a personal electronic device, for example a tablet, a laptop, a mobile phone, etc. In another embodiment, system 110 is built into an avionics system, and/or other electronic device used by pilots on a regular basis, such that it is substantially inseparable from the cockpit. One advantage of having system 110 built into the avionic systems of an aircraft, is that system 110 is coupled to a steady power supply, and cannot be accidentally left behind, or forgotten, for example, by the non-pilot user. However, one advantage of having a system 110 on a personal electronic device separate from the aircraft is that the device, and the interface for system 110, is familiar to the non-pilot user. For example, a non-pilot user may be most familiar with Apple®, Android or Windows products, and may have an increased comfort level interacting with system 110 installed on such a device, as opposed to another operating system.

In one embodiment, system 110 comprises a global positioning system (GPS) 112 configured to enhance guidance and provided flight instructions. GPS 112 is provided as one example navigational technology that might be used by system 110 in order to obtain navigational information. However, in another embodiment, system 110 may receive navigational information from another appropriate navigational systems. In another embodiment, another location determining technology, is employed by system 110, the aircraft 104, or another device accessible by system 110. In one embodiment, aircraft 104 includes a GPS 114, such that system 110 accesses GPS 114 data through a communication link with aircraft 104. In another embodiment, system 110 has access to both GPS 112 and 114, and both information may be presented, such that system 110 can access either GPS 112 data, GPS 114 data, or other aircraft technology (not shown in FIG. 1), such as aircraft technology used by ATC 106.

ATC 106 may comprise, for example, a service provided by a ground-based controller who directs air traffic on the ground, and through controlled airspace, a controller who is trained to provide advisory services to an aircraft in non-controlled airspace. ATC 106 may be useful to a non-pilot user of system 110, for example, to provide advice and instructions for landing the aircraft within the ATC-controlled airspace. ATC 106 may help prevent collisions between aircrafts, organize and expedite the flow of air and ground traffic, and provide information and other support for pilots, and non-pilot users in a distressed aircraft. In one embodiment, ATC 106 can communicate with aircraft 104, and second aircraft 108, using network 102 (e.g., radio with frequencies ranging from 118 MHz to 137 MHz). In addition to radios, ATC 106 may also communicate over communication network 102 with other ATC centers (not shown in FIG. 1). Communication network 102 may electronically link ATC 106 to first aircraft 104, second aircraft 108, and other ATC centers through the National Airspace System, which allows nationwide coordination of traffic flows to manage congestion. In certain embodiments, ATC 106 uses communication network 102 to electrically link to an outside source (e.g., another ATC) and receive information from a GPS 116 which system 110 can use to generate a flight path for first aircraft 104. In another embodiment, ATC 106 may use radar to monitor progress of aircraft 104, second aircraft 108, and instruct aircraft 104 and aircraft 108 to perform course adjustments as needed to maintain separation from other aircrafts (not shown in FIG. 1).

ATC 106, in one embodiment, may be familiar with the operation of system 110, for example through information or literature provided by a manufacturer of system 110, or from communications sent by system 110 to ATC 106 upon establishing a connection. In another embodiment, the non-pilot user of system 110 may be prompted by a script generated by system 110 to inform ATC 106 of the functionality of system 110, such that ATC 106 can effectively and safely offer assistance to the non-pilot user.

Figure 2:
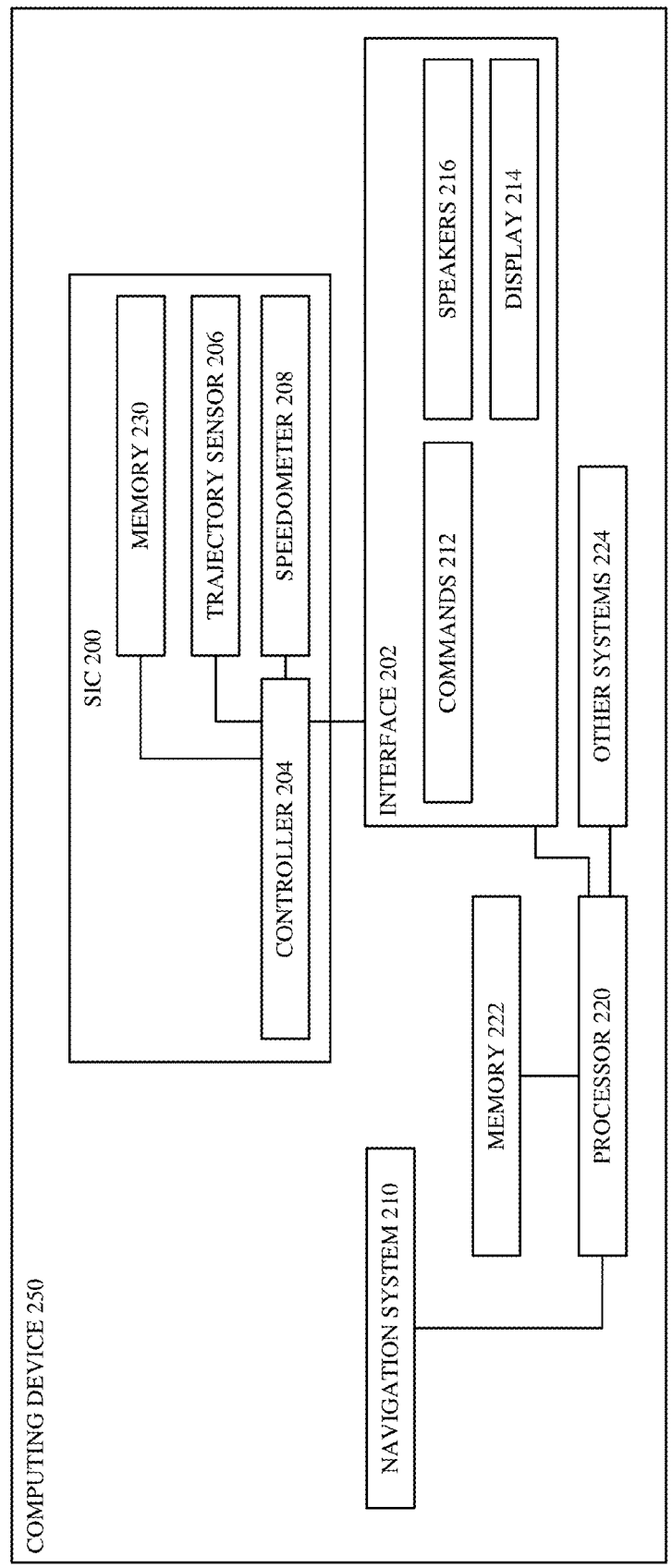
FIG. 2 illustrates an example schematic of a computing device configured to host a system for providing landing instructions in accordance with one embodiment of the present invention.

FIG. 2 illustrates an example schematic of a computing device configured to host a system for providing landing instructions in accordance with one embodiment of the present invention. In one embodiment, a system for providing landing instructions 200 comprises an input/output module 202, a controller 204, a trajectory sensor 206, a speedometer 208, and a GPS 210. In at least one embodiment, System 200 comprises a separate computing device from an avionic system within an aircraft. In another embodiment, system 200 comprises an operating system, or application software, configured to be downloaded onto a personal computing device 250, for example, a tablet, laptop, mobile phone, or other computing device, such that a user can access system 200 outside of an aircraft. However, in another embodiment, system 200 is part of a computing device 250 built into an aircraft's avionics system, such that it is not separate from, and cannot be removed, from an aircraft.

Computing device 250 may also comprise a navigation system 210, coupled to a processor 220, a memory 222, and other sub-systems 224, for example, other applications such as e-mail, internet browsing application, calendar, etc., available to a user of computing device 250. Navigation system 210 may comprise GPS, in one embodiment. Device 250 may also include an interface 202 comprising, in one embodiment, any of inputs 212, audio output component 216, and/or visual component 214. Inputs 212 may comprise, for example, keypads, switches, dials, a microphone, and/or touchscreen representations of actuatable inputs.

In one embodiment, when an input 212 is actuated, a signal is sent to controller 204. In response, controller 204 interprets the signal and performs a corresponding action. For example, a user may actuate an emergency indication 212. A signal may then be sent to controller 204, which may be configured to activate an emergency mode of system 200. Upon emergency mode actuation, system 200 may operate solely in an emergency mode, for example such that a user cannot accidentally leave the emergency mode until the aircraft has landed. Once actuated, system 200 may begin providing landing instructions for the aircraft. In one embodiment, controller 204 is configured to send alerts and instructions to a user such that the user can follow the step-by-step instructions to safely land the plane. Controller 204 may provide instructions, for example, for controlling an autopilot, controlling engine power, shutting down the aircraft, deploying an emergency ballistic recovery system, identifying an airport, controlling airport communication systems, and establishing two-way communication with an ATC or another aircraft. In one embodiment, controller 204 is configured to provide alerts and instructions through interface 202, for example on display 214 or through speakers 216 or through a wired or wireless connection to a headset worn by the user. The user may then respond to the instructions using any of inputs 212, or by following the steps given by controller 204. In at least one embodiment, system 200 is configured with sensitive enough systems to detect when instructions have been followed, or further deviations from the instructions occur.

In one embodiment, controller 204 receives location indicators from GPS 210 and, based on the received indicators, locates a suitable landing location, and generates a flight path for the aircraft based on the selected landing location, the present location of the aircraft, and known information about the aircraft. For example, in general, a larger aircraft requires a longer runway for a landing than a smaller aircraft. This may exclude a nearer, but smaller airport from a list of potential landing locations. In one embodiment, controller 204 is configured to use information received from GPS 210 to identify and navigate to an identified airport.

In one embodiment, navigation system 210 may provide indications of several potential landing locations. Navigation system 210 may send the indications of potential landing locations to controller 204. Controller 204 may exclude landing locations that are unsuitable, for example based on a size of runway, anticipated inclement weather, etc. Controller 204 may generate a plurality of potential flight paths based on remaining potential landing locations.

Controller may present a ranked list of potential landing locations. The ranking may be based on several factors, such as a current proximity of the landing locations, air traffic near the landing locations, landscape, weather, etc. Controller 210 may display a number of the potential location on screen 214, for example the top location, the top three locations, the top five locations, etc. The user may choose a flight path from the ranked list, for example using one of inputs 212. For example, if the pilot is in severe distress, for example having a heart attack or other medical emergency, the user may prefer an airport that is a further flying distance away from a present location, but located closer to a hospital. In at least one embodiment, a generated flight paths can be overridden by the user, for example based on instructions received from air traffic control, recommendations received from other pilots over the network, or for other reasons.

In one embodiment, trajectory sensor 206 is configured to identify whether a nose of the aircraft is currently angled with respect to the flight path. An angle may indicate that the aircraft is veering off the flight path, for example to the left, to the right, climbing or descending. If an angle exists, the aircraft may stray too far from the flight path, and may be incapable of safely landing at the selected landing location. As a result, in one embodiment, controller 204 may receive indications from trajectory sensor 206, and provide instructions to the user for basic flight control based on received indications. For example, controller 204 may alert the user and provide instructions on: changing course, climbing, descending, and/or changing other aircraft configurations.

For example, trajectory sensor 206 may identify that the nose of the aircraft is making an angle with the flight path at a time when the flight path dictates a horizontal orientation of the aircraft, required to facilitate level flight. If the angle is such that it will increase the altitude of the aircraft more than a preset threshold, for example, more than 400 feet per minute, it may require a correction. The trajectory sensor 206 may periodically send an indication of a detected nose angle to controller 204. Controller 204 may compare a detected angle to a deviation threshold and determine that the angle corresponds to an increase in altitude that requires correction. Controller 204 may then send an alert and accompanying instructions, in one embodiment, to the user such that the user can return the aircraft to the intended flight path. The alert and instructions may be provided over interface 202, for example, displayed on screen 214, and/or broadcast over speakers 216. Accordingly, a non-pilot user may then follow the instructions, and the alert may automatically terminate, in one embodiment, when it is detected that the aircraft is no longer increasing in altitude at a rate above the predetermine threshold.

However, in at least one embodiment, the user can disregard a presented alert. For example, ATC may indicate that a landing is not allowed at a given time and that the aircraft needs to circle and re-approach. In such a scenario, having an alert that cannot be disregarded may only increase an anxiety level of a non-pilot user. Therefore, the system may allow for the user to disregard alerts, and may even allow for indication that the alert is disregarded based on ATC instructions. Designating that ATC has provided counter-instructions may also ensure that at least some future detected deviations do not result in audible or visible alerts.

In one embodiment, speedometer 208 is configured to identify a current speed of an aircraft. In one embodiment, controller 204 may receive an indication from speedometer 208 of a current traveling speed. Controller 204 may compare the detected current traveling speed to a threshold range of allowable traveling speeds, and, upon detecting that the current travel speed is outside of the threshold range, provide instructions to the user for controlling engine power and managing aircraft speed to return the aircraft to an acceptable range.

For example, during a landing phase, speedometer 208 may identify that the aircraft is traveling at 115 knots. Speedometer 208 may send an indication of a current traveling speed to controller 204, and controller 204 may determine that the speed of the aircraft cannot be less than 5 knots below 100 knots, or 10 knots above 100 knots if the craft is to land safely at a selected location. Based on a threshold landing speed range, controller 204 may determine that the aircraft cannot land at its present speed, and may generate an alert and accompanying instructions for decreasing the speed of the aircraft. The alert may be delivered through interface 202, for example displayed on display screen 214, and/or broadcast over speakers 216. Accordingly, the user may then follow the instructions, and the alert may automatically terminate, for example when controller 204 detects that the aircraft is no longer operating at a speed outside of the threshold, for example above 110 or below 95 knots.

Alerts may be triggered by a number of other systems based on thresholds set by system 200, for example based on thresholds stored in memory 222 of computing device 250, or thresholds retrieved from an avionics system of the aircraft. Such thresholds, in at least one embodiment, are different from thresholds that would otherwise be followed by a trained pilot. As system 200 is designed to ensure greatest likelihood of safe landing of passenger and pilot, such thresholds are designed to allow for a non-trained user to operate the craft, land the craft, and safely exit the craft, with less regard for the functional operation of the aircraft post-landing. For example, constant alerts and corrective instructions may cause significant stress to a non-pilot user and increase the risk of a dangerous overcorrection. Therefore, thresholds may be set, not based on potential damage to the aircraft, but based on damage to the aircraft sufficient to present a threat to the passenger and the pilot. For example, a pilot may only land an aircraft within a tolerance of 10 knots landing speed in order to prevent damage. Such precision may not be within the skill level of a non-pilot user, who is likely in a state of distress. Therefore, thresholds may be widened to allow for greatest success of the non-pilot user in getting the craft safely to the ground, for example to the 20 knot range described above, which may allow the non-pilot user and the pilot to walk away from the landing site.

Figure 3B:
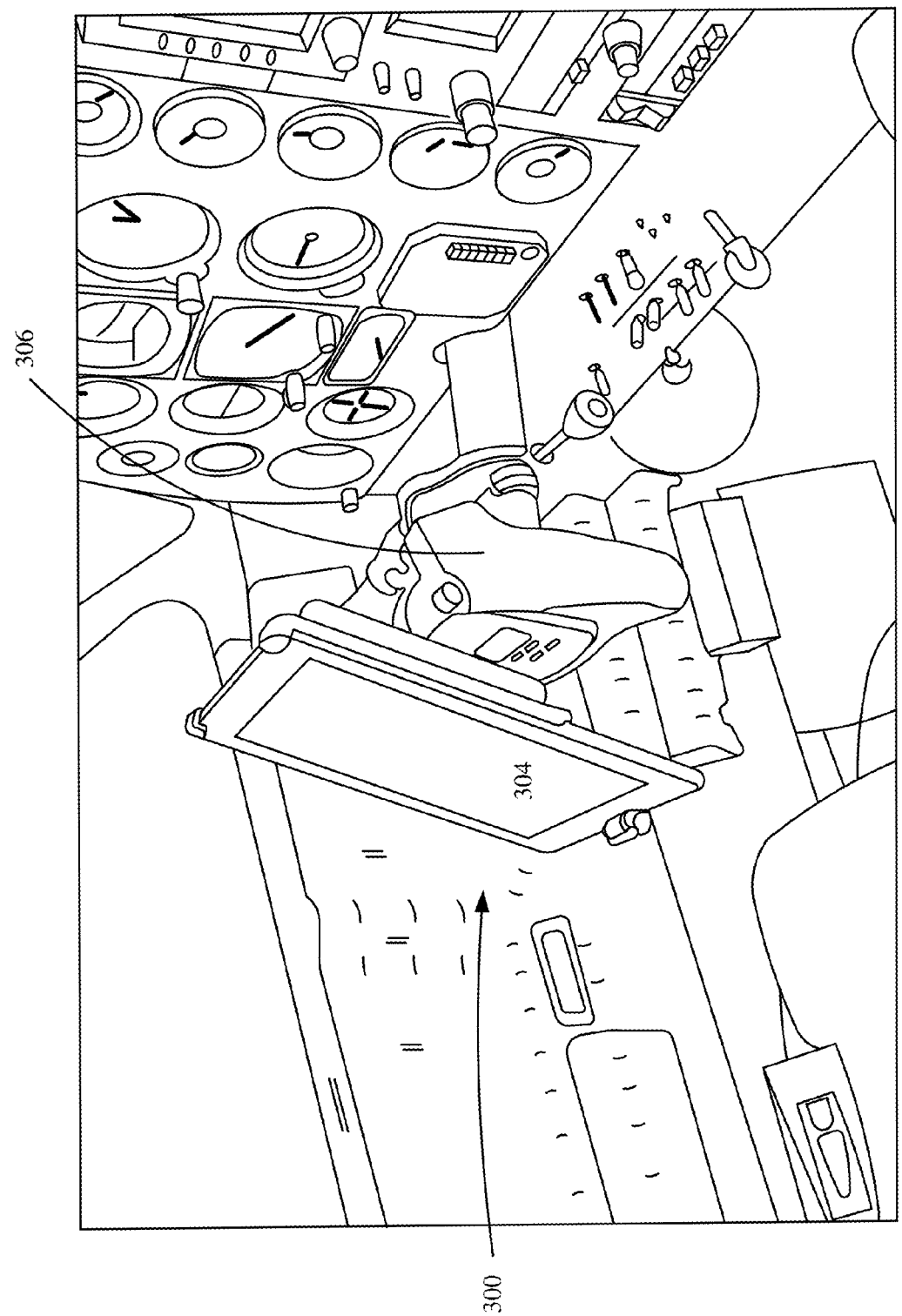

FIGS. 3A and 3B illustrate example embodiments of a computing device configured to host a system for providing landing instructions in accordance with some embodiments of the present invention. A landing instruction system, for example system 200, may be housed within a computing device 300. Computing device 300 may be configured to fit comfortably within a hand, or hands of a typical user, in one embodiment. Device 300 may, in one embodiment, be configured for convenient storage within the cockpit of an aircraft. Device 300 may comprise at least some components similar to those of a portable computer, for example a tablet, a laptop, a mobile phone, etc. In one embodiment, as shown in FIG. 3A, SIC device 300 is provided within a personal portable computing device which may have been previously purchased by the pilot or by a non-pilot user. Device 300 may comprise a screen 304, which may be a touch screen, or another screen technology, for example LCD, LED, etc. Device 300 may comprise a keyboard (not shown in FIG.

3A), a mouse, or other appropriate user input device. Device 300 may also be equipped with a microphone and speakers, for example such that it can receive audible user commands, and present information to a user in an audible format.

FIG. 3B illustrates another example computing device 300 configured to be positioned on a mount 306 within a cockpit of an aircraft. Mount 306 may be configured to allow a user, for example in the seat as shown in FIG. 3B, to have at least partial hands-free interaction with device 300, for example in order to follow along a flight plan set by the pilot. However, in an emergency scenario, the user may also be able to use device 300 to control an emergency landing of the aircraft. While the devices of FIGS. 3A and 3B illustrate a downloadable application, for example downloaded by a user onto device 300, it is also envisioned that system 200 may be configured only for the purpose of providing training and emergency instructions, and device 300 may not be configured to host other applications or provide non-flight related functionality. For example, device 300 may be included as part of the sale of an aircraft by the aircraft manufacturer. Such added safety features may constitute a selling point for pilots, and/or their spouses, in order to ensure maximum safety of the pilot and passengers.

However, while FIGS. 3A and 3B illustrate a separate, removable device, it is also envisioned that in at least some embodiments, system 200 may be installed within avionic systems of an aircraft, built directly into a cockpit, or aftermarket retrofitted into the aircraft.

Figure 3C:
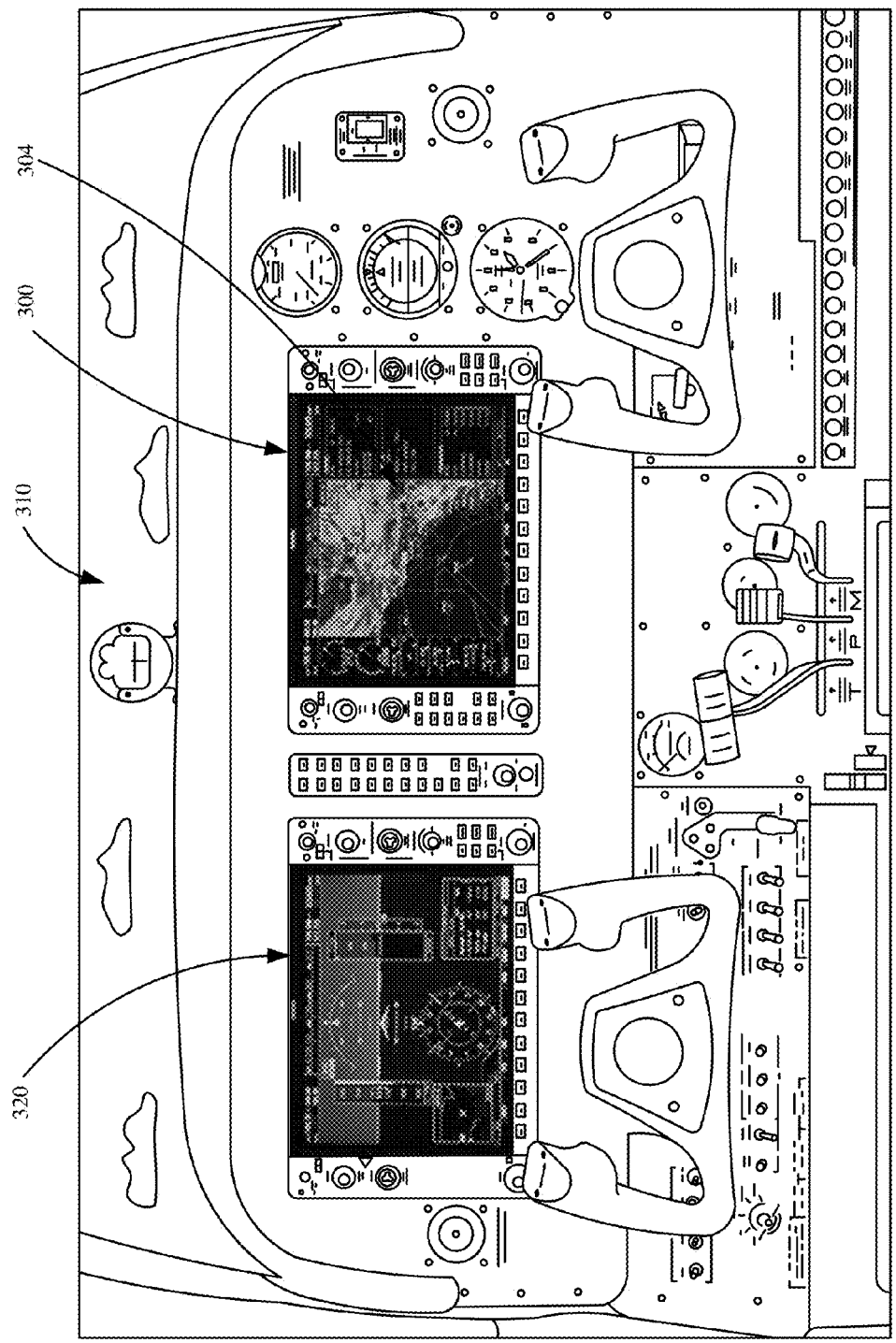

FIG. 3C illustrates one example computing device 300 with a multi-functional display 304 built into a cockpit 310. In one embodiment, a built-in computing device 300 draws power, navigational information and/or avionics system information directly from the aircraft. In one embodiment, cockpit 310 also includes a pilot display 320.

Figure 4:
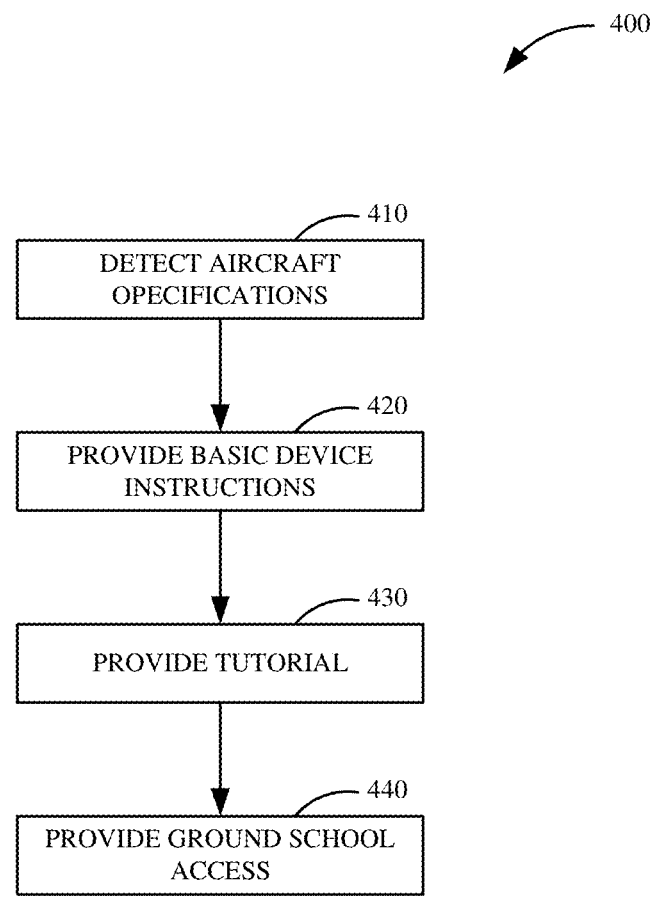
FIG. 4 illustrates an example method for setting up a system for providing landing instructions for an aircraft in accordance with one embodiment of the present invention.

FIG. 4 illustrates an example method for setting up a system for providing landing instructions for an aircraft in accordance with one embodiment of the present invention. Many aircraft comprise a plurality of different sub-systems, each controlled by different user input mechanisms located throughout the cockpit. However, user input mechanisms are not standard across aircraft manufacturers, or across models of aircrafts provided by a single manufacturer. Therefore, in order to ensure that a system, such as system 200 for example, can accurately provide information to a user in an emergency scenario, it is important that the system has as much information about a given aircraft in order to provide the most accurate prompts. For example, the system may need to know whether an aircraft has retractable landing gear. If an aircraft has retractable landing gear, a prompt may be given to a user during landing that the landing gear must be deployed. However, for an aircraft that does not have retractable landing gear, such a prompt may only confuse a user, and should be omitted from a landing sequence. Additionally, if an aircraft has an autopilot, or a parachute system, it is important for the system to guide a user through actuation of such systems. For example, it may always be preferable for an autopilot to be engaged prior to a landing. However, if an aircraft does not have an autopilot, the system will give manual instructions for every aspect of flying and landing the craft. Method 400, then, may be useful in order to initially setup aircraft information within the system.

In block 410, aircraft specifications are detected, in one embodiment. Aircraft specifications may be detectable, for example by entry of an aircraft model number and retrieval of aircraft specifications from a database. However, many pilots make enhancements or modifications after purchase of an aircraft. Therefore, the system may prompt a user to enter such modifications. In block 410, the system may also prompt the user to bring the most likely pilot or the owner of an aircraft over to assist in entering specifications, as a non-pilot user may not know the answers to many of the prompts presented. In one embodiment, the system is communicably connected to the aircraft in block 410, such that specifications are automatically provided from the aircraft to the system.

In block 420, at least some basic device instructions are provided to a user, in one embodiment. For example, a tutorial of the system for providing landing instructions may be presented such that a user has some experience with the user interface and functionality of the system prior to having to use it in an emergency scenario for the first time. In at least one embodiment, the tutorial is mandatory and cannot be skipped by the non-pilot user.

In block 430, an aircraft tutorial is provided, in one embodiment. The aircraft tutorial may be provided at least in part based on aircraft specifications provided to, or detected by, the system for providing landing instructions. For example, the system may be part of, or built into, an avionics system of an aircraft, and may already know about a majority of aircraft specifications, and may only need a user to input pilot modifications or enhancements. The tutorial may provide a user with some basic instructions on aircraft operation, for example where the controls are located and how to use them in order to have the craft climb, descend, turn, and other basic navigational techniques. The tutorial may also provide a user with a basic walkthrough on how to use communication systems, such that the user can communicate with ATC, or other aircrafts if necessary. The tutorial may also prompt the user with a set of refresher guidelines, for example in one embodiment every time the user logs in to the system it may present the user with a tutorial to refresh some of these basic skills. This may ensure that a non-pilot user at least always has a basic functional understanding of controls within an aircraft, such that in an emergency scenario, not all of the controls are foreign. This may increase confidence of a non-pilot user in an emergency scenario, and better ensure that the non-pilot user can safely land the aircraft.

In one embodiment, the aircraft tutorial is tailored to reflect the specifications of a given aircraft. For example, different aircraft have differently designed yokes for controlling flight. Additionally, while many aircraft have trim controls, they may be located in different positions in different aircraft models. Additionally, colors and sizes of different control mechanisms may vary by aircraft make and model. The tutorial may present images, for example selected from a database of images, based on a given aircraft make and model, such that a non-pilot user can easily locate the correct control based on a presented image prompt in a tutorial. Additionally, different control mechanisms may requirement movement-based actuation, for example pulling back, pushing forward, rotation in a clockwise or counterclockwise manner, etc. The tutorial prompt may, in one embodiment, provide an indication of how a given control mechanism should be actuated.

In block 440, in one embodiment, access to ground school training is provided. Many pilots, and some of their spouses, family members, and likely passengers, go through a ground school course in order to become basically familiar with operation of one or more aircraft. However, an emergency scenario may not occur until the specifics of a ground school training have faded from memory. Access to an initial course, or a refresher course may provide a non-pilot user with answers to questions, or specific tutorials for different aircraft subsystems. Access to an on-line ground school, as indicated in block 440, may provide a user with the ability either to sign up for, or get in touch with, a local ground school instructor in their area, take a digital course, or access on-line course materials. In at least one embodiment, ground school access in block 440 comprises a non-pilot user going through a ground school tailored to their aircraft, for example, based on received specifications about their aircraft.

Figure 5A:
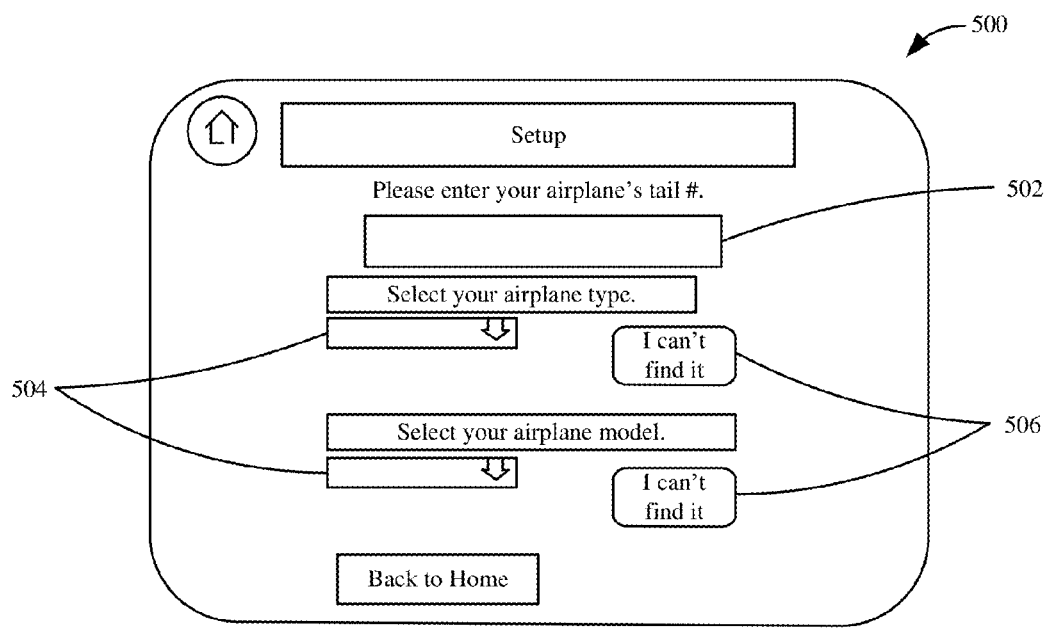
FIGS. 5A-5E illustrate some example user interfaces that may be presented to a user during setup of a system for providing landing instructions for an aircraft in accordance with one embodiment of the present invention.

FIGS. 5A-5E illustrate some example user interfaces that may be presented to a user during setup of a system for providing landing instructions for an aircraft in accordance with one embodiment of the present invention. User interface 500, may correspond to an initial interface presented to a user upon activation of the system. For example, a system for providing landing instructions, upon first activation, may require a user to enter specifications about at least one aircraft. In some embodiments, the system may allow for a user to enter specifications for a plurality of aircrafts, for example up to three, up to five, up to seven, etc. As illustrated in FIG. 5A, setup may comprise entering a tail number, for example through input mechanism 502. An aircraft tail number may function similarly to a driver's license for a car, such that the aircraft can be easily identified by, for example, ATC, another pilot, a manufacturer, etc.

After entering, or in addition to entering a tail number, in one embodiment, a user may also be prompted to enter information about a given aircraft. For example, selection indications 504 may allow for a user to select between, or enter, specific details about their aircraft. Additionally, interface 500 may provide one or more prompts 506, that may help a user located the information requested by the system if it is not information readily known or readily available to the non-pilot user. Selection indications 504 may comprise drop down menus, for example as shown in FIG. 5A.

FIG. 5A illustrates two example selection indications 504, aircraft type and aircraft mode. However for many aircrafts, other specifications may need to be entered, for example a manufacturer, modifications, and/or enhancements made by the pilot.

Figure 5B:
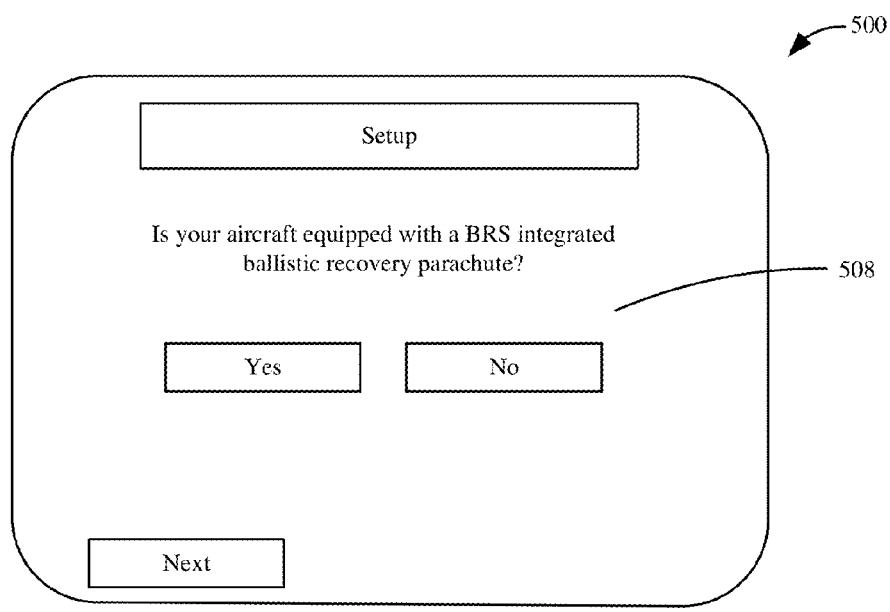

FIG. 5B illustrates one example user interface 500 providing a user with an example modification prompt 508. For example, some aircrafts are equipped with a ballistic recovery system, which is an aircraft-mounted parachute system. Such modification prompts 508 may be presented to a user, either all on a single screen, or in a sequence of user interface screens, such that the system obtains the most accurate information about a series of subsystems within a given aircraft.

Figure 5C:
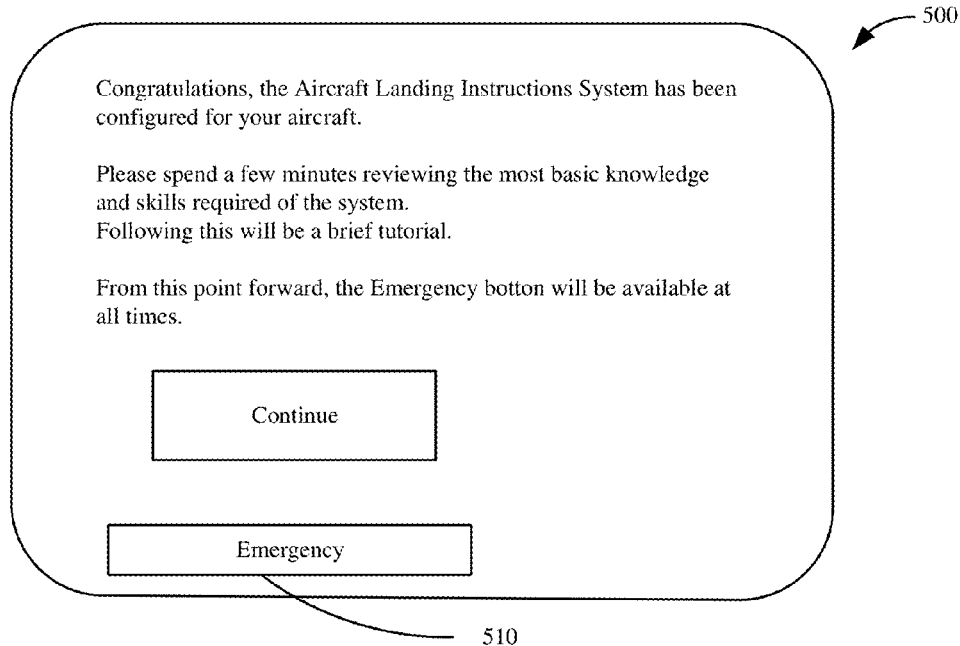
Figure 5D:
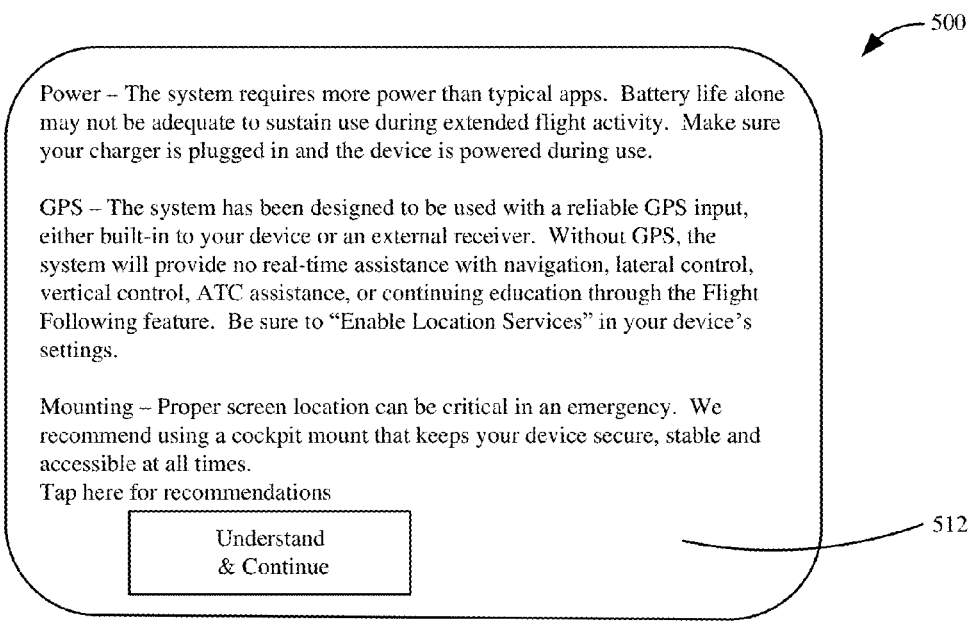
Figure 5E:
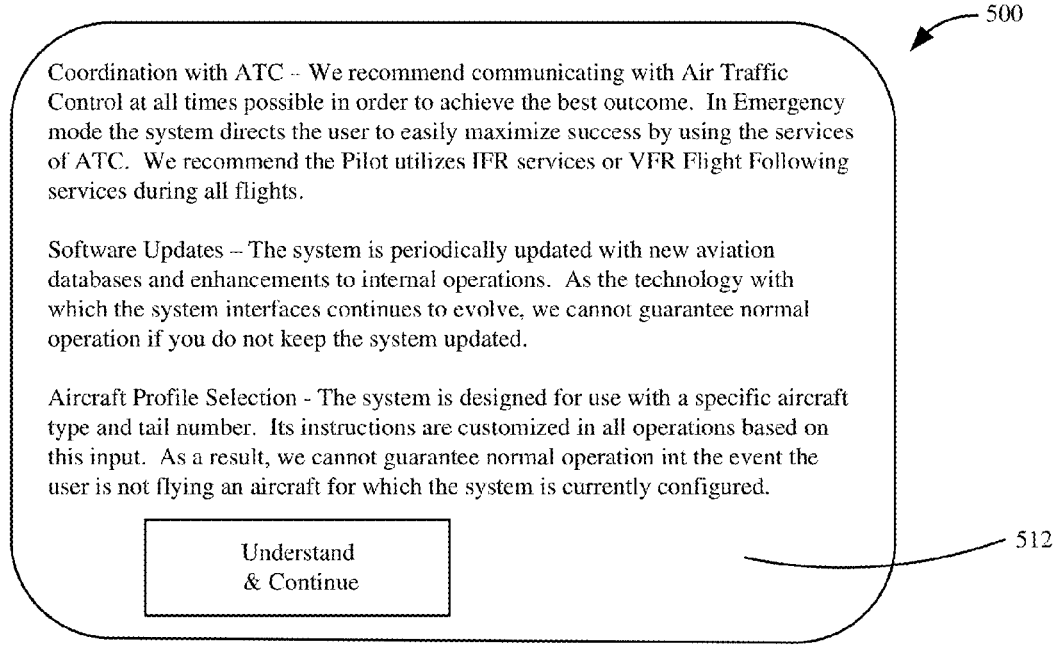

FIGS. 5C, 5D and 5E present examples of tutorial and warning screens presented to a non-pilot user upon configuration of an aircraft. For example, as indicated in FIG. 5C, after an initial setup has been completed, an emergency prompt 510 will appear on, and be available to, a user of system for providing landing instructions, on all screens. In one embodiment, a user may be required, before accessing a home screen of the device, to review a very basic tutorial of the system, such that the user can have at least some familiarity with the system in the event of an emergency.

A series of warning screens 512 may be presented to a user, in one embodiment, in order to ensure that the system is handled properly. For example, as indicated in FIG. 5D, the system requires a considerable amount of power. For this reason, system may be used most effectively, when it is connected to an external battery, or other external power source, during a flight. The device may be configured, in at least one embodiment, to receive periodic updates about remaining battery life for a device, such that if a low battery threshold is reached, for example 10 or 15% remaining battery life, a warning screen is prompted to a user to ensure that the device is connected to an external power source, such that in the event of an emergency, the system has sufficient power to get a non-pilot user safely landed. Additionally, as indicated in FIG. 5D, warning screen 512 may provide a user with information on how to mount the device, for example in an embodiment where the device is separate from the avionics systems of the aircraft, or was not provided with a mount for permanent placement within a cockpit. Additionally, as indicated in FIG. 5D, the device may work best when in communication with a GPS, or other location service. In one embodiment, the device may enable a user to turn on such location services through either the system interface, or by prompting the user on how to do so using their device. In at least one embodiment, upon activating a system for providing landing instructions, location services are automatically enabled by an override command sent by the system to the device. Also as indicated in FIG. 5E, in one embodiment, the system may instruct the user that safe landing is best achieved when communication is coordinated with ATC. For example, from a cockpit, a non-pilot may not be able to directly contact emergency medical services. Contacting ATC may ensure that a distressed pilot has access to necessary medical attention immediately upon landing.

Figure 6:
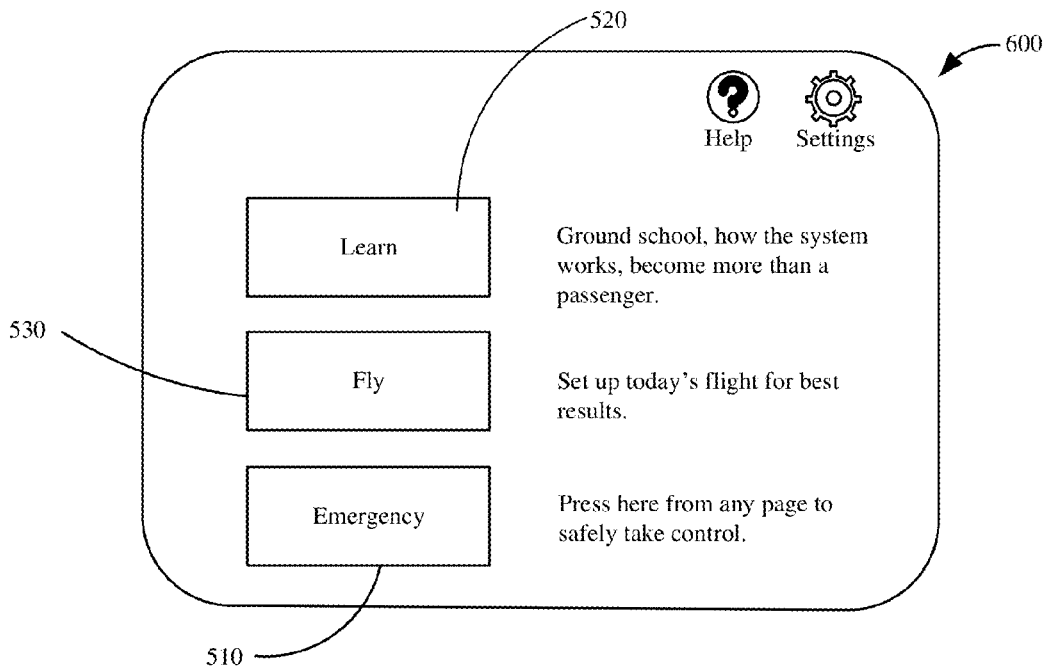
FIG. 6 illustrates an exemplary user interfaces that may presented to a user upon initiating a system for providing landing instructions for an aircraft in accordance with one embodiment of the present invention.

FIG. 6 illustrates an exemplary user interfaces that may be presented to a user upon initiating a system for providing landing instructions for an aircraft in accordance with one embodiment of the present invention. In one embodiment, after an initial setup has been completed, for example entering specifications for one or more aircraft, the next time a user activates the system they may be presented with a user interface 600. User interface 600 may comprise a series of actuable indications corresponding to different modes of system operation. For example, interface 600 may comprise an indication 510, which may cause the system, when actuated, to enter an emergency mode. Interface 600 may also comprise an indication 530 that may, when actuated, allow for a user to enter information about a current or upcoming flight such that they can "fly along" with their pilot. Interface 600 may also comprise an indication 520 that may, when actuated, allow a user to access additional training information, for example information on ground school classes, information on how the system operates, or additional training such that they can increase their knowledge of flying and the specifications of their aircraft, such that the user has sufficient confidence in the event that an emergency occurs.

Figure 7:
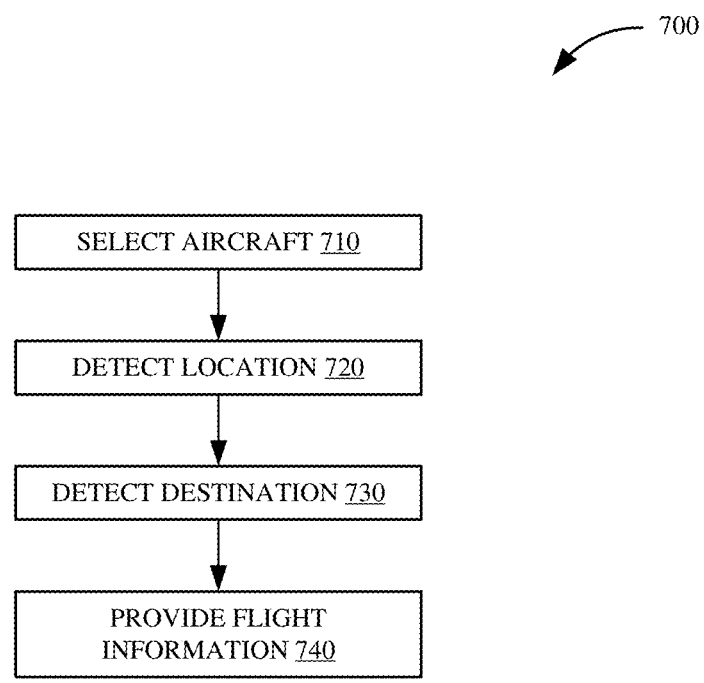
FIG. 7 illustrates an example method for setting up a fly-along mode of the system for providing landing instructions for an aircraft in accordance with one embodiment of the present invention.

FIG. 7 illustrates an example method for setting up a fly-along mode of the system for providing landing instructions for an aircraft in accordance with one embodiment of the present invention. Method 700 may be useful for a passenger interested in 'flying-along' with their pilot on a current or upcoming flight. Additionally, for many takeoff operations, there may be some down time for a passenger between getting into an aircraft, and taking off, for example as the pilot may need to complete a pre-flight checklist. Having the opportunity to setup a flight, using method 700, may encourage a non-pilot user to gain some familiarity with a system for providing landing instructions, such as system 200, for example, during pre-flight downtime.

In block 710, an aircraft is selected. In one embodiment, specifications for only one aircraft are stored by the system, which may then automatically select the aircraft. However, in the event that a non-pilot user has access to multiple aircrafts, a prompt may be provided to the non-pilot user to select an aircraft for a current or upcoming flight. Additionally, in one embodiment, the system may be able to detect which one of a plurality of aircrafts will be used, for example using wireless communication between the system and the aircraft. In an embodiment where the system is built into the aircraft, aircraft selection is completed automatically upon start-up of the system for providing landing instructions.

In block 720, a current location of the system for providing landing instructions is detected. The current location may correspond to a takeoff location, or current flying location, in one embodiment, obtained by a location detection system. For example, in at least one embodiment, a user can setup a current flight for a 'fly-along' after takeoff, while the craft is in the air. In one embodiment, the location is detected using GPS, or other navigational equipment, associated directly with the system, or associated with the aircraft itself. In another embodiment, the user may be able to manually enter a takeoff location, for example, for an upcoming flight, for example if the user is not yet at the takeoff location.

In block 730, a flight destination is detected. The destination may be detected, in one embodiment, by receiving an indication from a user of, for example, a destination city, a destination airport name, or airport code. In one embodiment, the destination may be selectable based on one of a series of previously entered airport destinations.

In block 740, flight information is provided to the user. In one embodiment, flight information is updated substantially in real time, based on detected changes in location and trajectory. Updated flight information, in one embodiment, comprises providing a user with updated information about their nearest airports, and other geographical features. In one embodiment, providing flight information comprises only providing periodic updates. In one embodiment, the device supporting the system for providing landing instructions may also provide other functionality for a user, and providing flight information comprises presenting flight information on a portion of a device display in conjunction with the other functionality.

FIGS. 8A-8F illustrated exemplary user interfaces that may be presented to a user in a fly-along mode of the system for providing landing instructions for an aircraft in accordance with one embodiment of the present invention. In one embodiment, as indicated in FIGS. 8A-8F, an emergency mode indication 510 is presented to a user at any time that the system is in a fly-along mode. This is advantageous, as during any flight, at any time, a pilot may experience some disability or discomfort such that they are incapacitated and can no longer fly. Having instant access to an emergency mode, for example through indication 510, may provide at least some measure of comfort to a passenger, and immediate access to the emergency mode in the event that the pilot experiences distress.

Figure 8A:
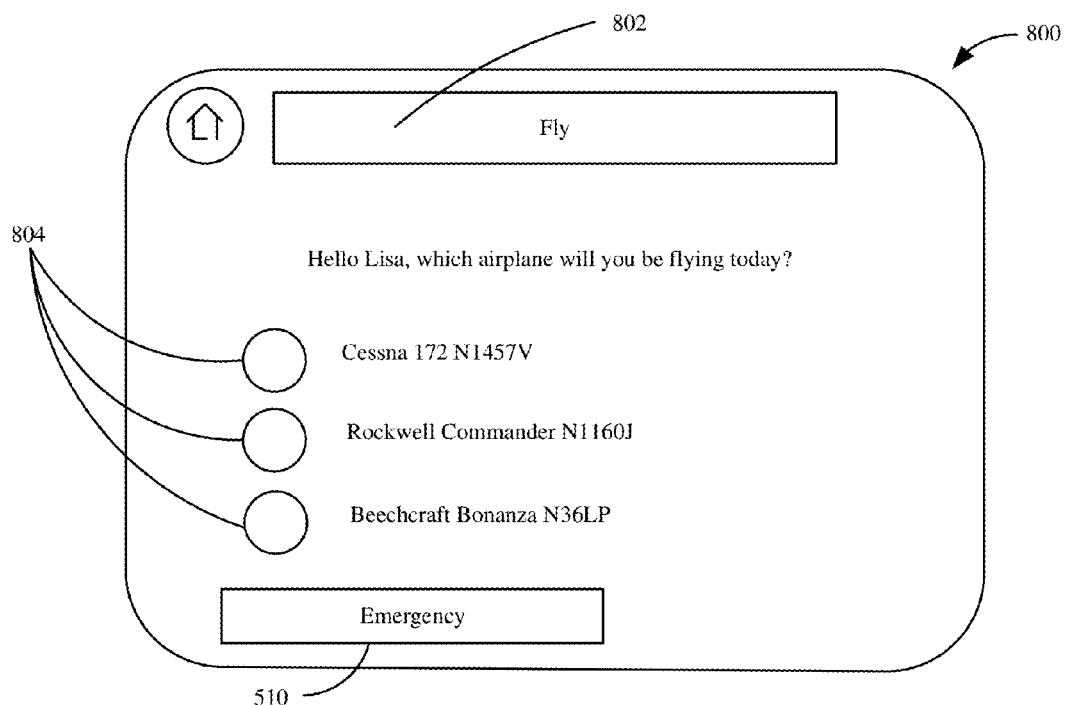
FIGS. 8A-8F illustrated exemplary user interfaces that may be presented to a user in a fly-along mode of the system for providing landing instructions for an aircraft in accordance with one embodiment of the present invention.

In the embodiment illustrated in FIG. 8A, user interface 800 presents a user, for example Lisa, with a series of input indicia 804, each corresponding to one of a series of aircrafts previously setup, for example by Lisa (or Lisa's pilot). In one embodiment, Lisa can select the aircraft that she either is currently in, or plans to use, for an upcoming flight. In one embodiment, while in a fly along mode, a fly along mode indication 802 is presented within user interface 800.

Figure 8B:
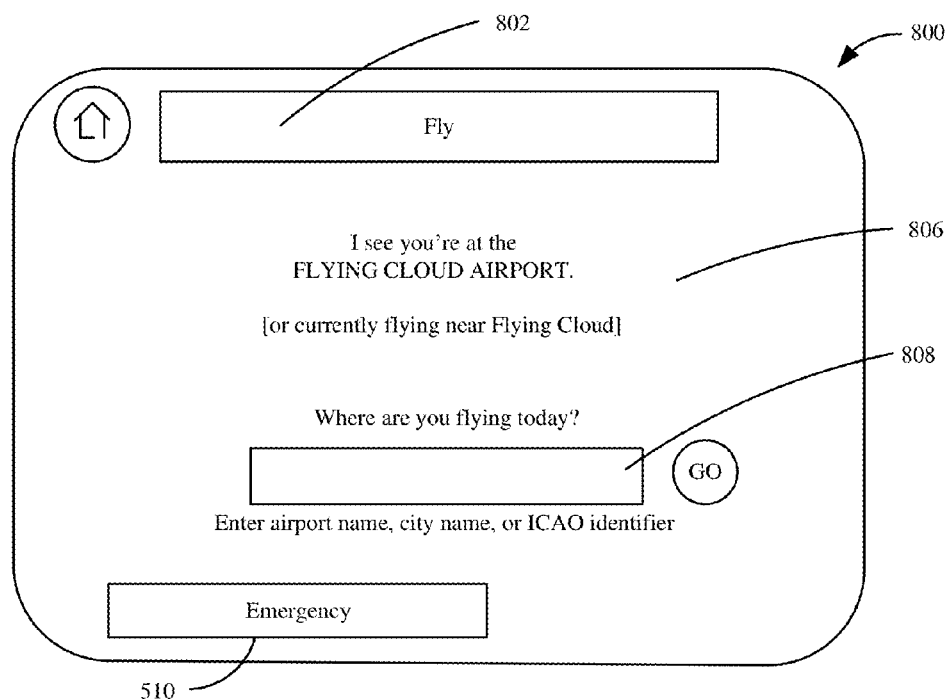

FIG. 8B illustrates an exemplary user interface 800 that may be presented to a user in a fly-along mode of the system for providing landing instructions. In one embodiment, a user may enter a current location, or an upcoming flight take-off location. In one embodiment, as indicated in FIG. 8B, the system may detect a current location 806, for example using internal location-detecting functionality or by communicating with an aircraft. The user may, in one embodiment, change a detected take-off location, for example if the user is not going to take off from a current location, or if the user has selected an incorrect take-off location. In one embodiment, on the same interface 800, or on a different interface 800, a user can enter their destination 808. A user may enter a destination through a destination indication 808, for example using an airport name, city name, or airport code identifier. In one embodiment, the system is configured to receive audible indications from a user.

Figure 8C:
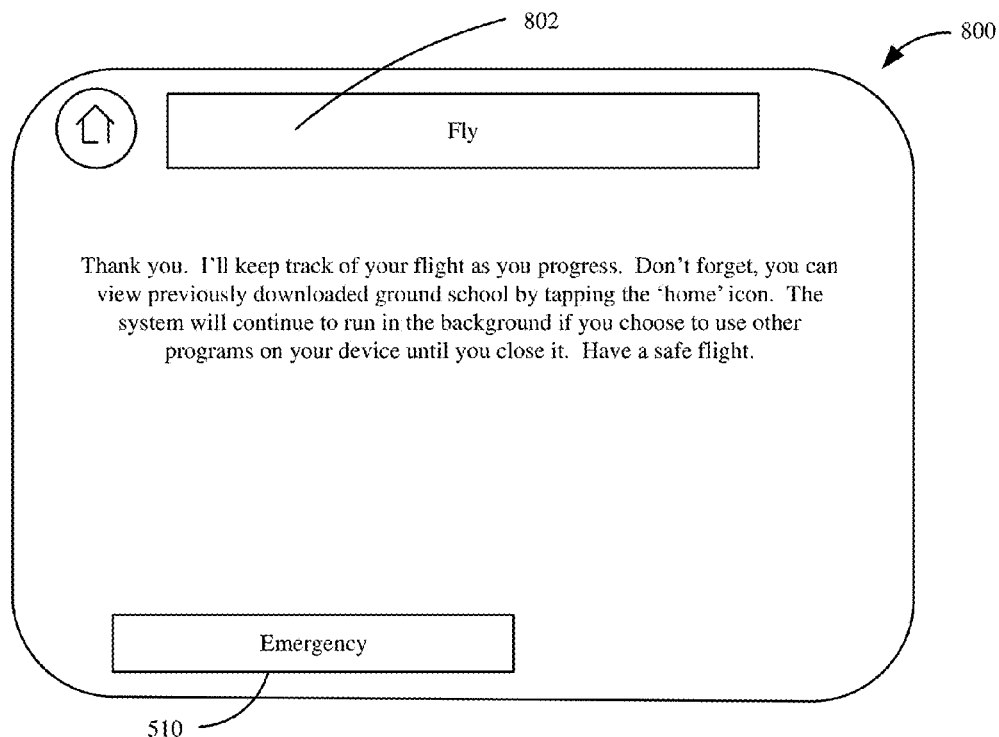

Once a flight is setup, in one embodiment, the system may present a message similar to that illustrated in FIG. 8C. The system may remind the user that it will track information about a current flight while other functionality, for example system training functionality, or other non-system applications, are active.

Figure 8D:
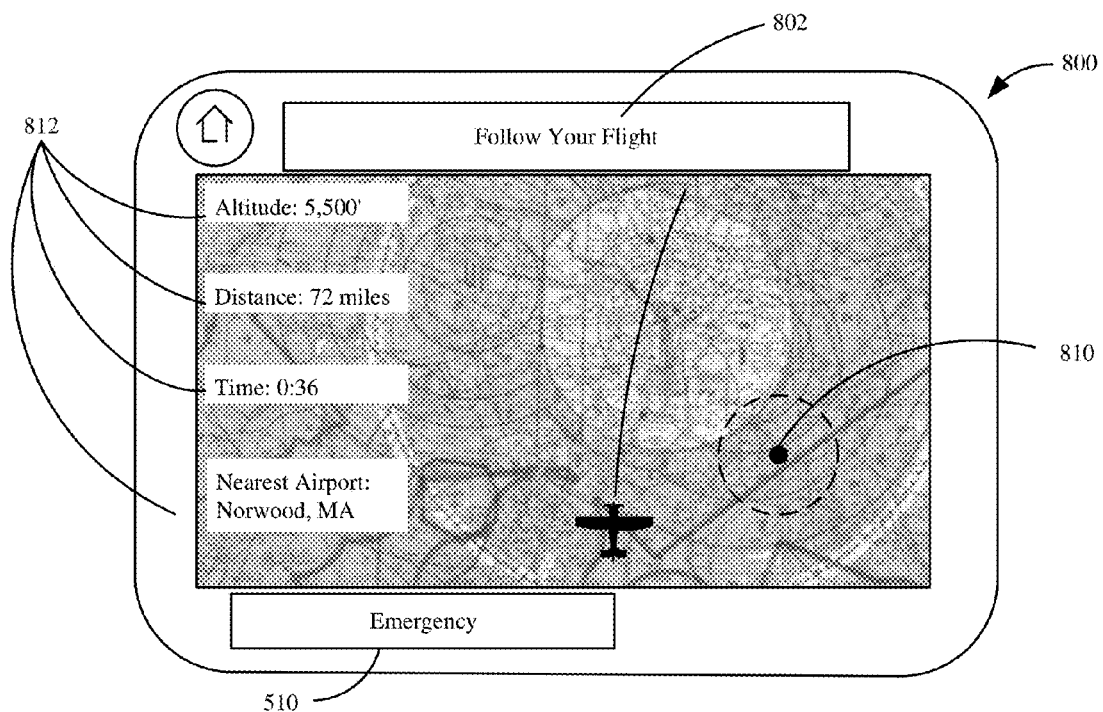
Figure 8E:
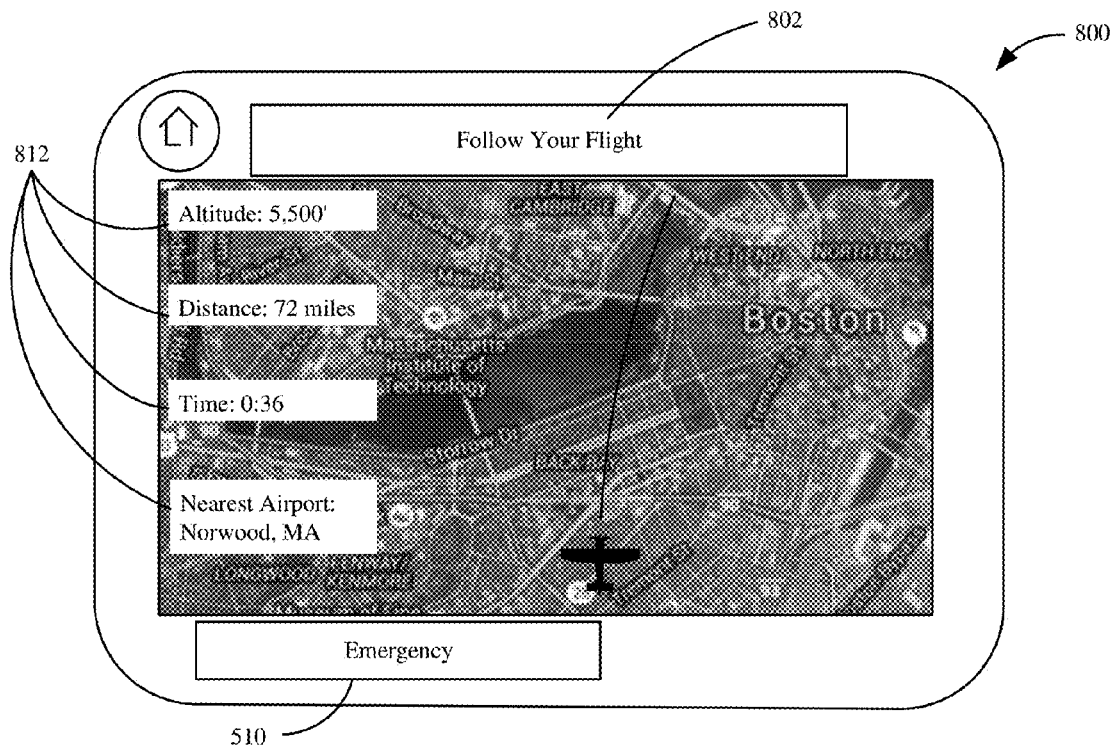

FIGS. 8D and 8E illustrate exemplary user interface views that may be presented to a user in a fly along mode of the system for providing landing instructions. In one embodiment, for example that shown in FIG. 8D, flight schematics similar to those presented to a pilot are provided, such that the user may become accustomed to the map schematics used by a pilot. Interface 802 may comprise different flight parameters 812, for example a current altitude, distance to a specified destination, a time to the destination, and a nearest airport, in one embodiment. The nearest airport may also be indicated by an airport indicator 810 presented on the schematics. In another embodiment, for example that shown in FIG. 8E, a more conventional map is provided. A user may be able to select which map experience they prefer, for example that of FIG. 8D, 8E or another map schematic desired by the user.

Figure 8F:
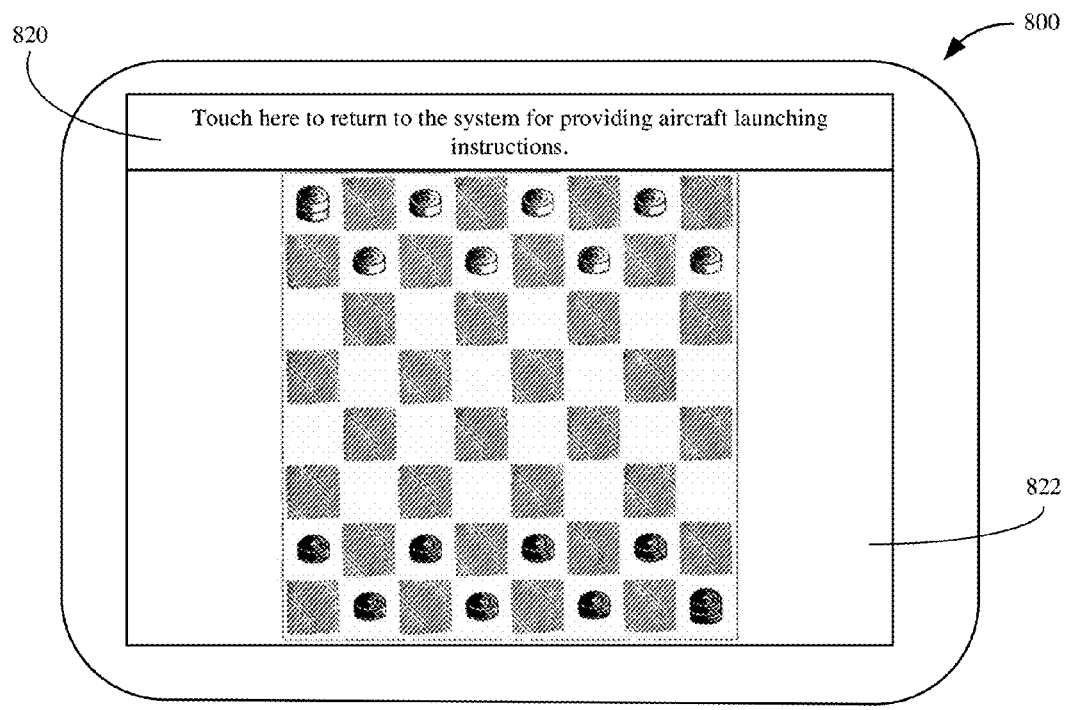

As shown in FIG. 8F, in one embodiment, a user may be able to interact with other applications on their personal computing device without deactivating the system for providing landing instructions. However, the user may, in one embodiment, always have access to the system, for example by actuating an indication 820. In one embodiment, indication 820 is always presented on a portion of user interface 820. The indication 820 may be presented such that it is always clearly visible, but does not obstruct, other functionality of a personal computing device engaged by the user during a flight.

Figure 9A:
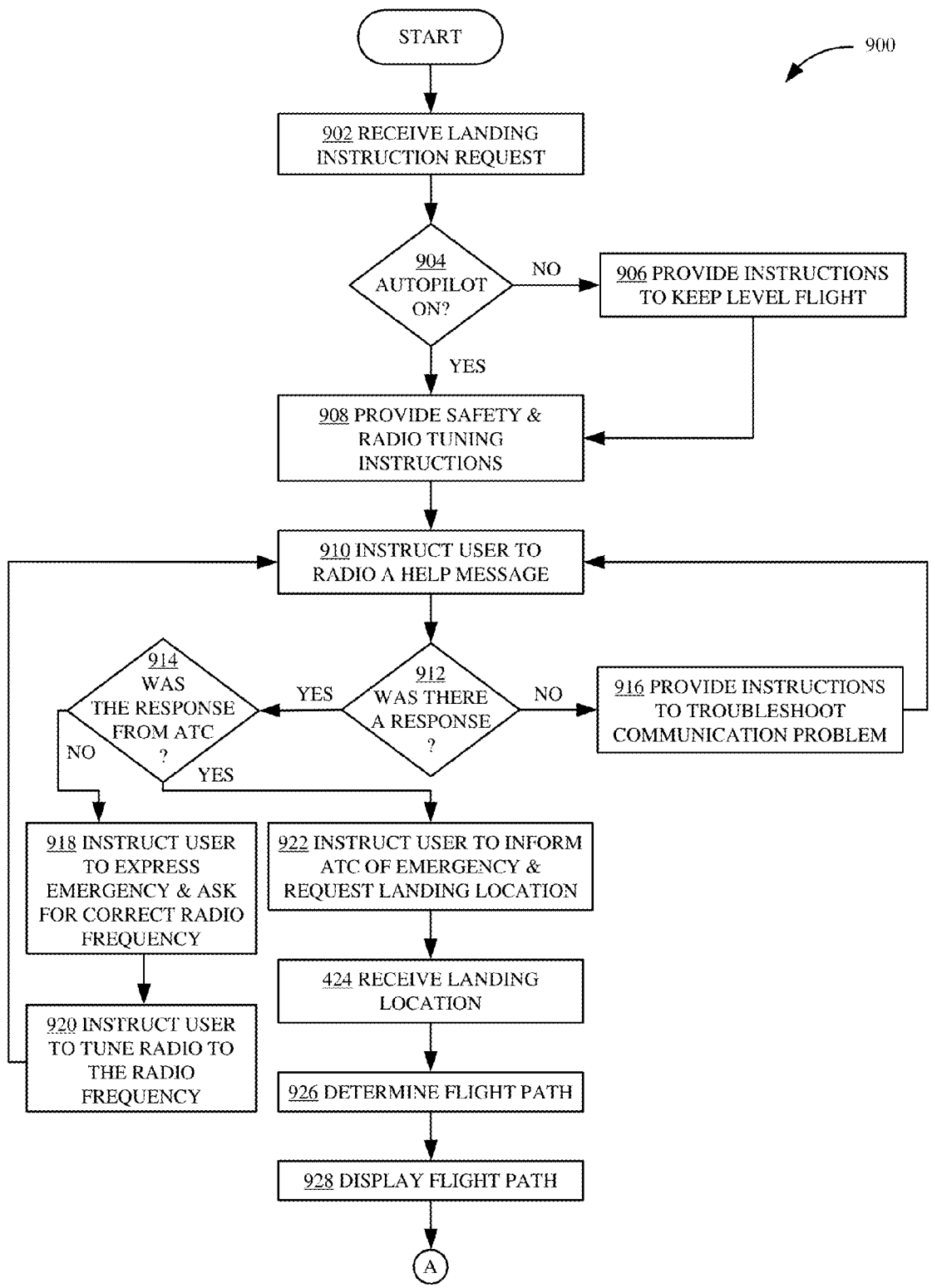
FIGS. 9A and 9B illustrated an example method for providing landing instructions for an aircraft in accordance with one embodiment of the present invention.
Figure 9B:
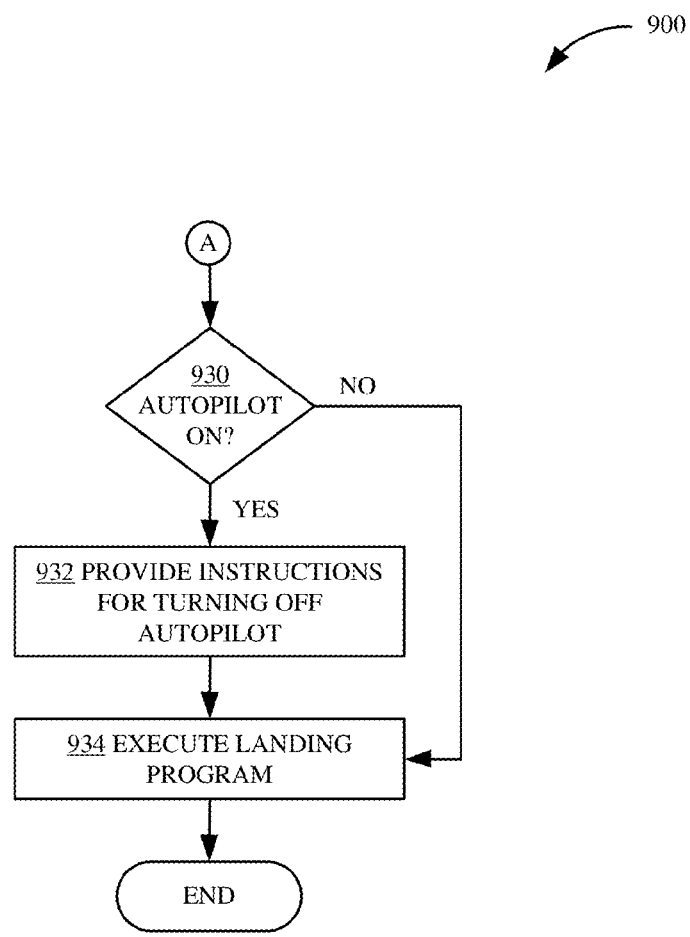

FIGS. 9A and 9B illustrated an example method for providing landing instructions for an aircraft in accordance with one embodiment of the present invention. Method 900 may be useful to provide landing instructions for a non-pilot user of an aircraft in an emergency situation.

In block 902, a request for emergency landing instructions is received. In one embodiment, the request is received by a user actuating an emergency mode, for example by actuating an indication present on a user interface of a system for providing landing instructions.

In block 904, an initial message may be sent, asking the user if the autopilot for the aircraft is on. The message may provide the user with instructions for determining whether an autopilot is on, and how to engage an autopilot if it is not currently active. However, in an embodiment where the aircraft does not have an autopilot, this step may be automatically omitted by the system, for example based on previously entered aircraft specifications. The message may be sent, in one embodiment, over a display screen, or over a speaker system, or both. In one embodiment, the user may indicate either that "yes" the autopilot is currently on, or "no."

In block 906, in an embodiment where an aircraft does not have an autopilot, or the user cannot engage the autopilot, the system may provide instructions, for example through the display and/or over a set of speakers, on how to keep the aircraft at flight level. To keep the aircraft level during flight, the system may present instructions on how to control, for example, a pitch altitude of the aircraft, an elevator trim of the aircraft, a bank of the aircraft, and/or engine power.

In block 908, in one embodiment, in response to a user indication that an autopilot is on, safety instructions and radio tuning instructions may be provided. Safety instructions may comprise, for example instructions on how to fasten a seatbelt and/or shoulder harnesses, and instructions for setting an emergency transponder code.

In block 910, in one embodiment, instructions may be provided in order to assist the user in sending out a help message over a radio, or other wireless communication functionality. In one embodiment, instructions are provided for contacting an ATC. In another embodiment, instructions are provided for contacting nearby pilots.

In block 912, in one embodiment, the system for providing landing instructions may prompt the user to indicate whether or not a response to a help message was received. In one embodiment, the system may detect whether or not an incoming response was received, and may prompt the user to indicate whether the response was satisfactory. In one embodiment, the system may prompt the user to indicate whether a received response came from ATC or from another pilot.

In block 916, in one embodiment, if a user indicates that no response was received, or the response was unsatisfactory, instructions may be provided to help the user troubleshoot the communication problem. Method 900 may then return to block 910, such that the system instructs the user to re-send the help message. If there is again no response, as indicated in block 912, block 916 may comprise presenting instructions on how to adjust a headset, turn the radio to a certain frequency (e.g., 121.5 MHz), set or adjust the audio panel, and then may re-instruct the user to send the help signal again. Method 900 may progress through the steps of blocks 910, 912 and 916 until a response is received.

In block 914, in one embodiment, a response is received. If the system detects, or the user indicates, that a response was received to the help message, the system may prompt the user to indicate whether the response was from an ATC, or from another pilot. If the response was not from ATC, and was from another pilot (for example, second aircraft 108 shown in FIG. 1), block 918 may present the user with instructions on how to express their emergency and ask for a correct radio frequency to contact ATC.

In block 920, in one embodiment, a message may be provided instructing the user on how to tune the radio to a provided frequency, for example a frequency provided by a second aircraft. After the user has re-tuned the radio, in one embodiment, the system may instruct the user to send the help message again.

In block 922, in one embodiment, upon detecting that the response to the help message was from ATC, instructions may be provided, for example in the form of a script, assisting the user in expressing their emergency and requesting a landing location and/or landing instructions.

In block 924, in one embodiment, a landing location, or a series of landing locations may be received. Once a landing location is selected, in one embodiment, as indicated in block 926, the system calculates a flight path from a detected current location to the selected landing location.

In block 928, in one embodiment, once generated, the flight path may be displayed on a display screen to the non-pilot user. The flight path may be displayed, in one embodiment, on a flight schematic map. In another embodiment, the flight path is displayed in a more conventional map. The system may select a map for displaying a flight path based on, for example, a previous setting indicated by the user, or based on settings used in a fly-along mode.

FIG. 9B depicts a continuation of a method 900 for providing landing instructions for an aircraft.

In block 930, in one embodiment, a message may be sent asking the user if the autopilot is on. If the user indicates that the autopilot is on, in block 932, instructions may be provided for the user to turn the autopilot off. While an autopilot mode of an aircraft may be sufficient for level flight, it may interfere with landing the aircraft at a desired landing site. Therefore, in at least one embodiment, the system may instruct the user to turn the autopilot off in anticipation of an upcoming emergency landing.

In block 934, in one embodiment, a landing program may be executed. The landing program may include a fly sequence, an approach sequence, and a landing sequence. In one embodiment, the steps of blocks 930, 932, and 934, are not executed until a user is within an approach proximity to a designated airport for landing. In at least some embodiments, use of an autopilot provides for safer aircraft control than a non-pilot user flying the aircraft unassisted. However, at least some autopilots, in at least some aircrafts, cannot facilitate landing of the craft without pilot intervention.

Figure 10A:
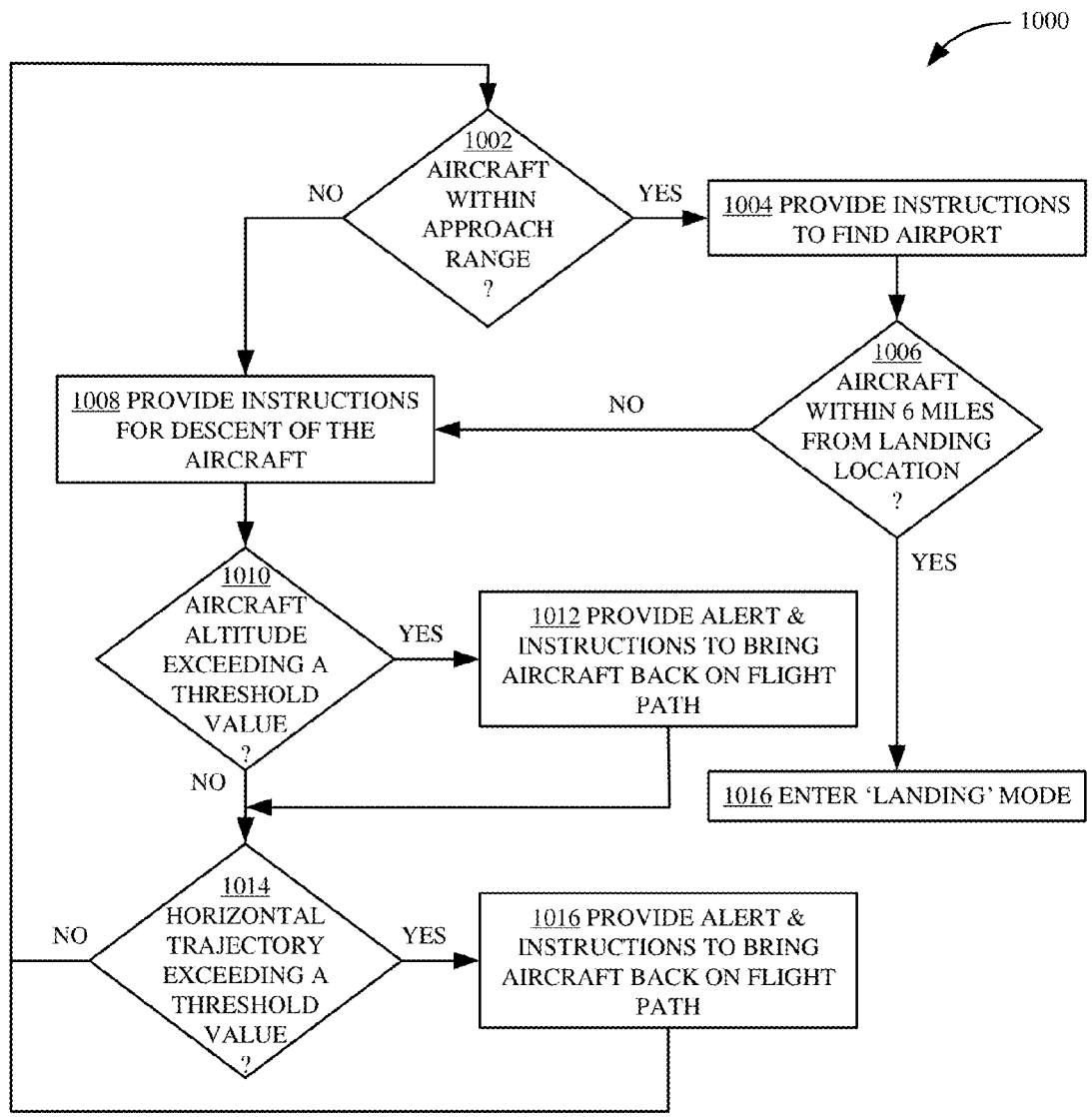
FIGS. 10A and 10B illustrates an example method for executing an approach sequence using the system for providing landing instructions for an aircraft in accordance with one embodiment of the present invention.
Figure 10B:
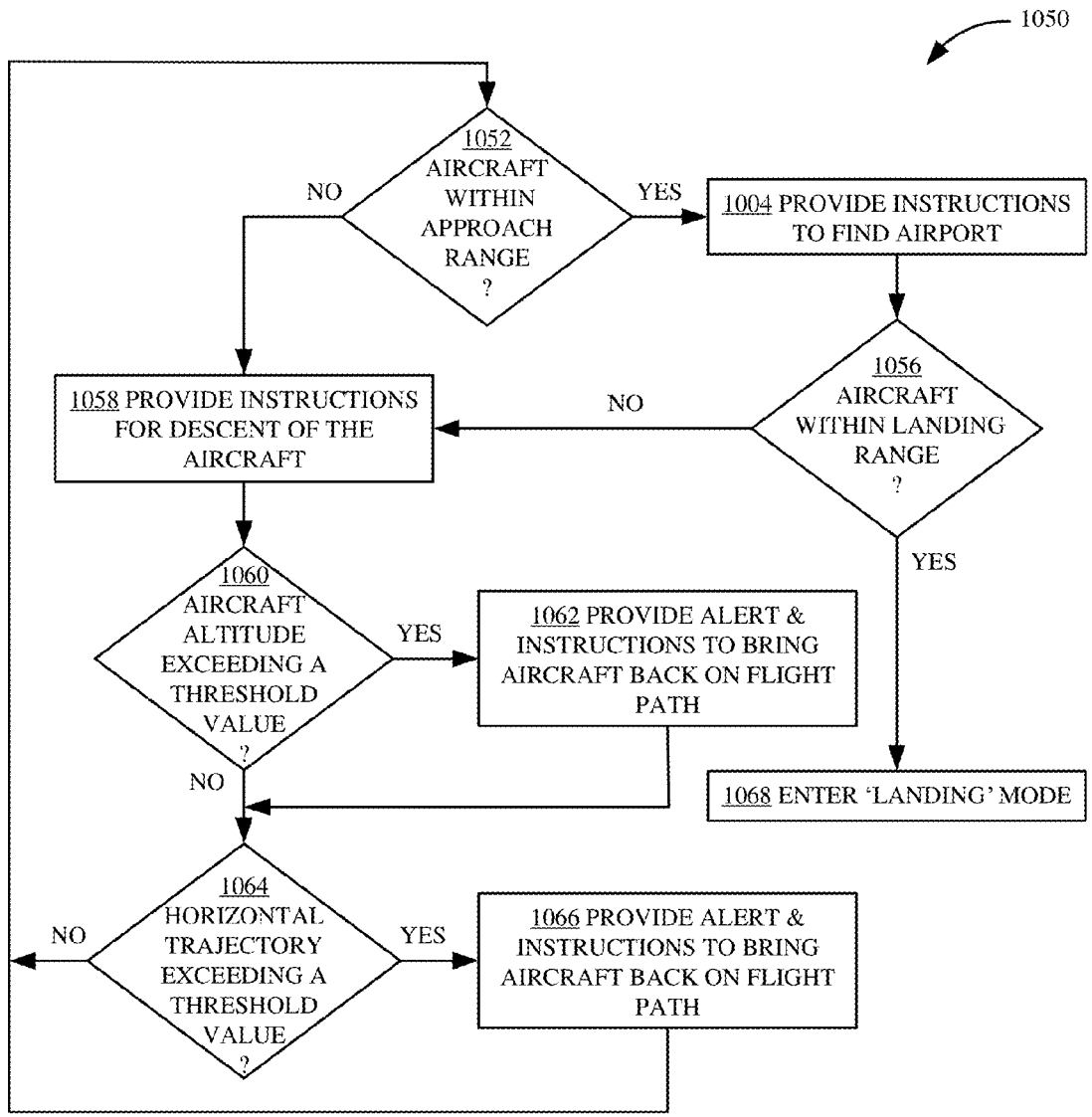

FIGS. 10A and 10B illustrates an example method for executing an approach sequence using the system for providing landing instructions for an aircraft in accordance with one embodiment of the present invention. Method 1000 may be useful for executing a fly sequence of a landing program, executed, for example, prior to entering an approach mode.

In block 1002, a system may detect whether or not the aircraft is within a maximum distance of a selected landing location. The approach distance may be dictated, in one embodiment, by a flight time to the landing location, for example, 10 minutes from the landing location. In another embodiment, the approach distance is measured in absolute distance, for example 30 miles from a landing location. If the system detects that the aircraft is within 10 minutes of the landing location, for example, the landing program may proceed to an approach sequence, as indicated in block 1014.

In block 1004, in one embodiment, the system detects that the aircraft is not within an approach range of a selected landing location. Upon detecting that the aircraft is not close enough for execution of an approach sequence, instructions may be provided to a non-pilot user for maintaining level flight of the aircraft.

In block 1006, in one embodiment, the system checks a current altitude of the aircraft. In one embodiment, checking a current altitude comprises determining whether or not the altitude of the aircraft exceeds a threshold value. For example, in one embodiment, if the aircraft were to climb or descend from the flight path greater than 400 feet per minute, the aircraft will not have enough time and/or space to maneuver back to the flight path in order to safely land at the selected location. As a result, if the aircraft is climbing or descending by more than 400 feet per minute from the flight path, in block 1008, an alert is presented to a user.

In one embodiment, the alert comprises, in addition to an indication of a detected deviation, instructions on how to bring the aircraft back onto a desired flight path. Instructions may be provided over a display and/or over a set of speakers. In one embodiment, instructions may comprise instructions for controlling the pitch and trim of the aircraft, instructions for controlling engine power, and instructions for reading the altimeter, and controlling the altitude of the aircraft. In one embodiment, the provided instructions comprise generic instructions on how to control motion of the aircraft. In another embodiment, the provided instructions are tailored specifically to the detected deviation. For example, in response to a detection that the aircraft is climbing, instructions may comprise instructions on how to descend back to, and remain level at, the flight path.

In block 1010, in one embodiment, the system checks a current path of the aircraft. In one embodiment, checking a current path comprises detecting whether or not a horizontal trajectory of the aircraft is exceeding a threshold value. For example, if the system detects that the aircraft is deviating more than 15° from the flight path, or the rate of change is greater than 3° per second, the aircraft may not have time and/or space to maneuver back to the flight path in order to safely land at the landing location. As a result, the trajectory of the aircraft is greater than 15° from the flight path or the rate of change is greater than 3° per second, in block 1012, an alert is presented to the user. In one embodiment, the alert is presented in conjunction with instructions on how to bring the aircraft back to the desired flight path. The instructions provided in block 1012 may also comprise instructions for controlling the bank of the aircraft, in one embodiment.

The checks described with respect to blocks 1006 and 1010 may, in one embodiment, be periodically repeated during a flight operation, and may be checked simultaneously, or separately. Additionally, if values exceeding threshold values are detected for both altitude and trajectory, the system may present instructions to the user on how to fix one, the other, or both at the same time.

In one embodiment, the execution of method 1000 repeats, as indicated in the loop comprising at least blocks 1002, 1006 and 1010, until it is detected that the aircraft is within a maximum distance of the landing location, or that the approach sequence should be initiated.

FIG. 10B illustrates a method for executing an approach sequence 1050 of a landing program.

In block 1052, a system for providing landing instructions may detect that an aircraft is within an approach range of a selected landing location. For example, in one embodiment, the system may detect that the aircraft is within 10 minutes (or another appropriate distance) of a landing location.

In block 1054, in one embodiment, upon detecting that the aircraft is within range of the landing location or, in another embodiment, upon being sequenced manually by the user, instructions may be provided to the user to locate the landing location. In at least one embodiment, a confidence message is also provided to the user (e.g., "You're doing great, keep up the good work!" or "We're almost there, it's time to land."). A non-pilot user may experience considerable stress during an emergency landing, and a confidence message may help to reduce experienced stress, which may increase the likelihood of a safe landing.

In block 1056, in one embodiment, the system detects whether or not the aircraft is within a landing range of the landing location. In one embodiment, the landing range comprises a shorter distance from the landing location than the approach range. If the aircraft is within, for example, 6 miles of the landing location, the landing program may proceed to the landing sequence, as indicated at block 1068.

In block 1058, in one embodiment, the system detects that the aircraft is outside the landing range of the selected landing location, and/or that instructions have been provided to a non-pilot user in an aircraft within the landing range. The system may, in one embodiment, provide instructions to the user for descent of the aircraft. The instructions provided in block 1058 may comprise instructions for descent control, aircraft level, and cruise reminders, for example.

In block 1060, in one embodiment, the system checks an altitude of the aircraft. In one embodiment, checking the altitude of an aircraft comprises determining whether the altitude of the aircraft exceeds a threshold value. In one embodiment, during a descent, the aircraft needs to descend within an allowable descent range. For example, the descent range may comprise a range between a maximum and minimum descent angle allowable to achieve a landing at a selected landing location.

In one embodiment, if the system detects that the aircraft is climbing, or descending from the flight path at an angle outside the descent range, an alert is provided to a user, for example as indicated in block 1062. The alert provided in block 1062 may be accompanied with instructions on how to bring the aircraft back to the desired flight path.

In block 1064, in one embodiment, the system may detect that the horizontal trajectory of the aircraft is greater than an allowable deviation threshold value. For example, if the aircraft is drifting to the right, or to the left, it may not be able to complete a safe landing at the landing location. In one embodiment, if the detected trajectory of the aircraft is greater than the threshold value, or the rate of change is greater than the threshold rate, in block 1066, an alert is presented to the user. In one embodiment, the alert comprises instructions for returning the aircraft back to the flight path. In one embodiment, checking a trajectory in block 1064 may operate similarly to checking a trajectory in block 1010 described previously, however the trajectory threshold ranges may be different. In one embodiment, method 1050 may repeat through blocks 1052, 1058, 1060 and 1064 until an aircraft is within a landing range of the landing location.

FIG. 10B illustrates one embodiment of a method for executing a landing sequence where a system first checks an altitude of an aircraft, and then checks a trajectory of an aircraft. However, in another embodiment, the system first checks a horizontal trajectory, then an altitude. In another embodiment, checks of altitude and trajectory are conducted simultaneously. In one embodiment, method 1050 periodically repeats through blocks 1060 and 1064, and provides corrective instructions as needed to the non-pilot user.

Figure 11A:
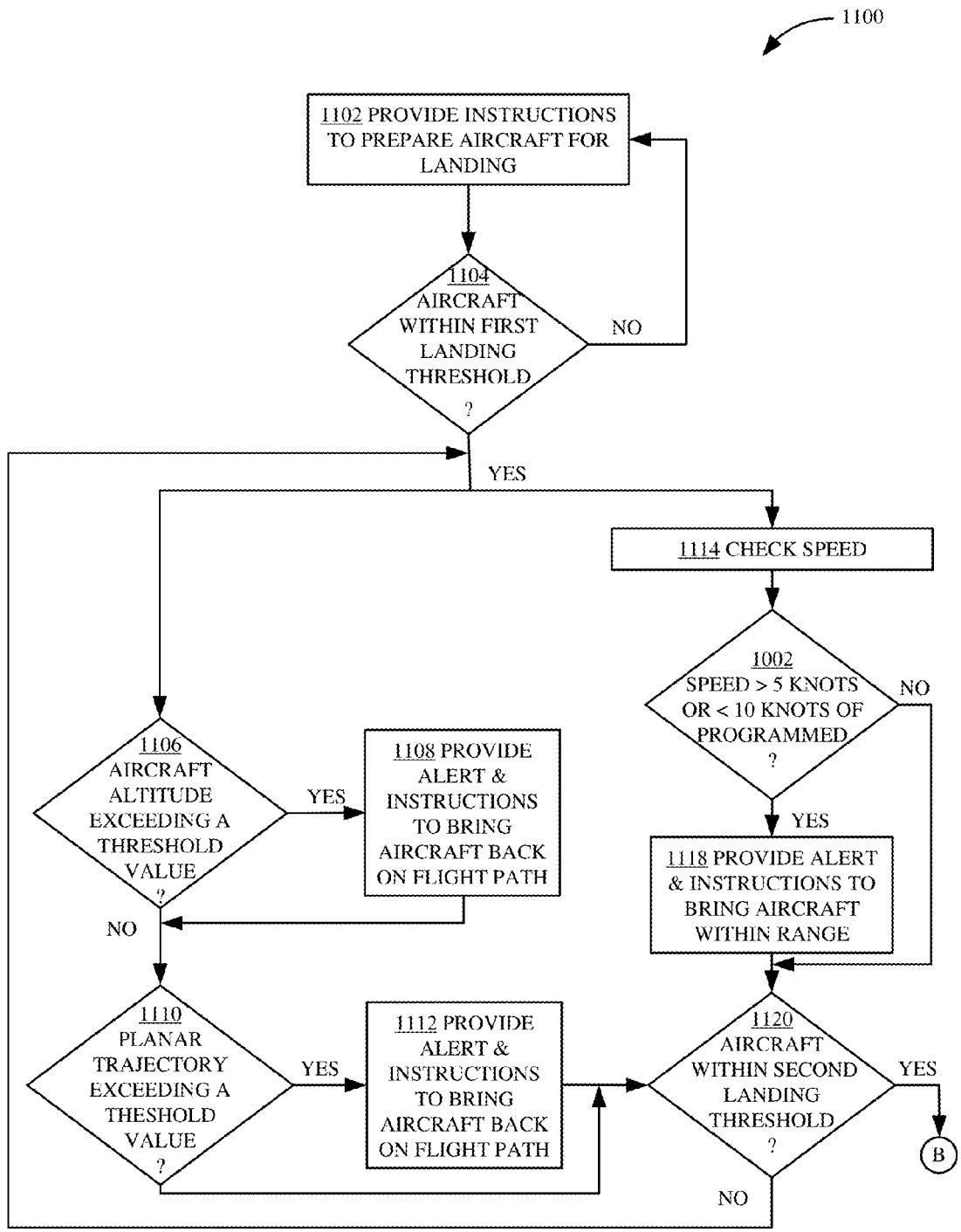
FIGS. 11A and 11B illustrate an example method for executing a landing sequence using the system for providing landing instructions for an aircraft in accordance with one embodiment of the present invention.
Figure 11B:
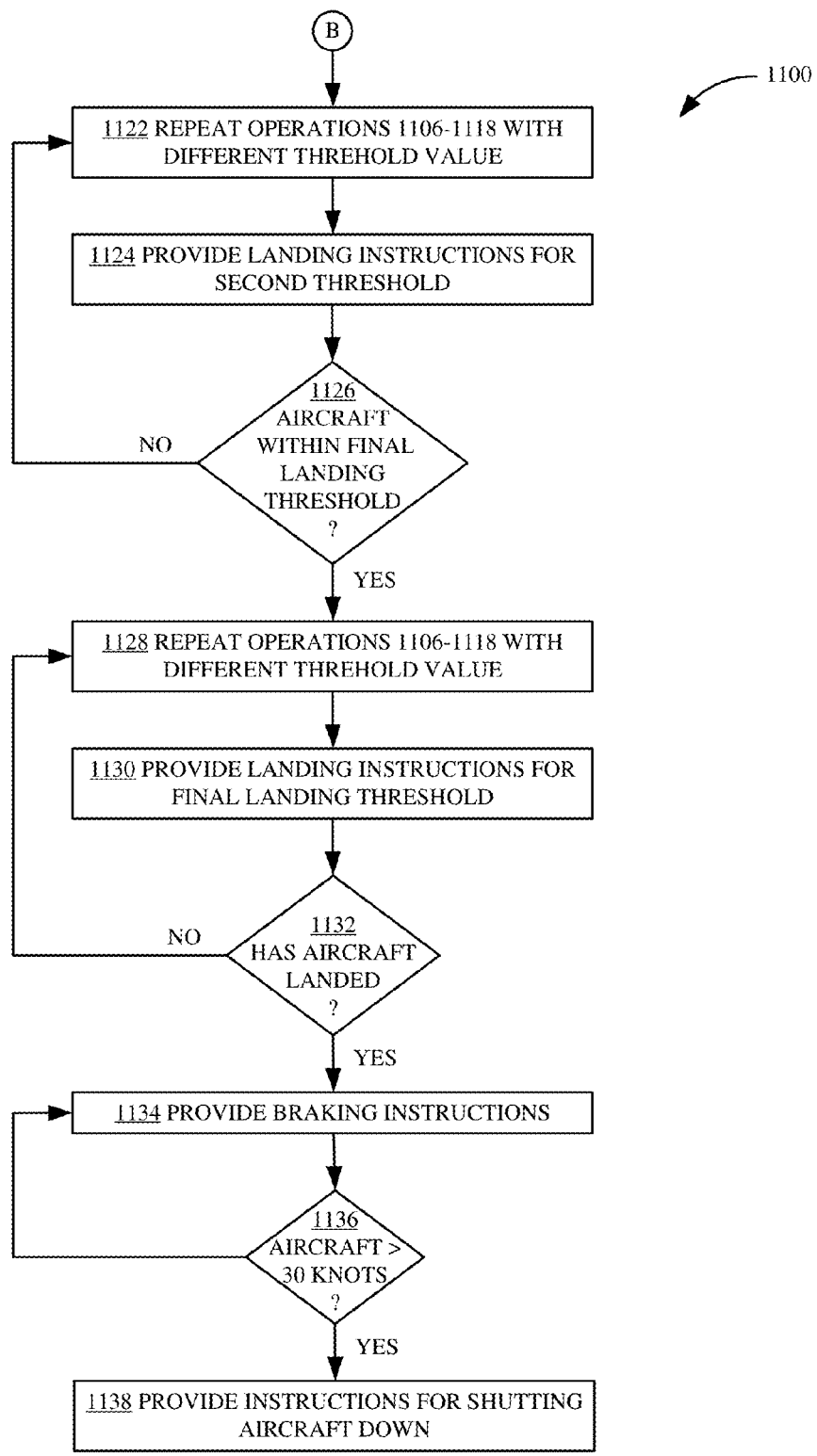

FIGS. 11A and 11B illustrate an example method for executing a landing sequence using the system for providing landing instructions for an aircraft in accordance with one embodiment of the present invention.

In block 1102, instructions are provided for a user on how to prepare the aircraft for landing. The preparation instructions, in one embodiment, comprise a confidence statement to calm and increase confidence of the non-pilot user. The preparation instructions may also guide the non-pilot user on setting an appropriate approach power and pitch of the aircraft, deploying landing gear (in an aircraft with retractable landing gear) and putting the flaps down (in an aircraft with one or more flaps).

In block 1104, the system for providing landing instructions may detect that the aircraft is within a first landing threshold of the landing location. For example, in one embodiment, the first landing threshold may be three miles. If the aircraft is not within a first landing threshold of the landing location, additional landing instructions may be presented to the user in one embodiment.

In block 1106, the system detects that the aircraft is within the landing threshold of the landing location. The system then checks an altitude of the aircraft and compares it to a threshold landing altitude. The threshold landing range may be wider than the range allowed in block 1006, for example, in one embodiment. In another embodiment, the threshold range may be narrower than the range allowed in block 1006. In one embodiment, the landing range allowable for a non-pilot user may be greater than that adhered to by a pilot in a normal flight scenario. For example, the system may be designed with the goal of getting the non-pilot user to bring the craft in close enough proximity to the ground that the non-pilot user can survive the landing, which may be achieveable under a different range of descent angles than would be adhered to by a trained pilot.

In block 1108, if the detected altitude is outside of a threshold landing altitude range, for example if the system detects that the aircraft is flying too high or too low, the system may present the user with an altitude alert. The alert may comprise, in one embodiment, instructions for bringing the aircraft back in line with an intended flight path.

In block 1110, the system checks a trajectory of the aircraft and compares it to a threshold landing trajectory deviation. The allowable deviation from a landing trajectory be wider than the range allowed in block 1010, for example, in one embodiment. In another embodiment, the threshold range may be narrower than the range allowed in block 1010. In one embodiment, the landing range allowable for a non-pilot user may be greater than that adhered to by a pilot in a normal flight scenario.

In block 1112, if the detected trajectory deviates from a landing trajectory by more than an allowed deviation range, for example if the craft is on a trajectory that will cause it to miss a runway at the landing location, the system may present the user with an alert. The alert may comprise, in one embodiment, instructions for bringing the aircraft back in line with an intended flight path.

In one embodiment, the system may cycle through blocks 1106-1112 may continue to loop as the aircraft approaches a landing location. Additionally, while method 1100 illustrates an embodiment where the system first checks an altitude, and then checks a trajectory, against landing thresholds. However, in another embodiment, the system first checks a trajectory, and then an altitude of the aircraft against landing thresholds. In a further embodiment, the system simultaneously checks an altitude and a trajectory of the aircraft.

In block 1114, in one embodiment, a speed of the aircraft may be compared to a threshold landing speed. In one embodiment, the speed of the aircraft is checked in conjunction with an altitude/trajectory, as indicated in method 1100. In another embodiment, however, the system may cycle through periodic checks of a current speed, altitude and trajectory of an aircraft against landing thresholds, and provide alerts and/or instructions as deviations are detected.

In block 1116, a detected current speed is compared to both a maximum and a minimum threshold. For example, an aircraft has to have a minimum speed at landing in order to ensure that the craft stays airborne. However, if a craft exceeds a maximum threshold, a length of the landing strip may not be long enough to accommodate landing the craft. In one embodiment, the range between the maximum and minimum thresholds for a non-pilot user is greater than a threshold range for a pilot user, as method 1100 is designed to allow a non-pilot user to successfully bring a craft to the ground such that passengers are safe upon landing. For example, if the aircraft is traveling at 5 knots below a threshold of, in one embodiment a target landing speed of 100 knots, or 10 knots above the threshold, the aircraft will not be able to land safely at a given landing location. As a result, if the aircraft is traveling below 95 knots or above 110 knots, in block 1118, an alert is provided to the user to bring the aircraft back within an allowable speed range. The alert may be accompanied with instructions reminding the non-pilot user on how to reduce or increase the speed of the aircraft accordingly.

If a current speed of the craft is within an allowable speed range, or it has been brought back within an allowable speed range, in block 1120 it may be detected whether or not the aircraft is within a second threshold range of the landing location, for example, two miles in one embodiment. If the aircraft is not within a second threshold range of the landing location, in one embodiment, method 1100 may repeat a cycle through blocks 1114-1118 and/or blocks 1106-1112.

FIG. 11B depicts a continuation of method 1100 for executing a landing mode of a landing program in accordance with one embodiment of the present invention. If the aircraft is within a second landing threshold of the landing location, method 1100 may proceed to block 1122, as indicated in FIG. 11B.

In block 1122, in one embodiment, upon detecting that the aircraft is within a second threshold distance of the landing location, for example two miles, method 1100 may cycle through steps similar to those outlined in blocks 1106-1118. In one embodiment, the thresholds used while the craft is within the second threshold distance are different than those used while the craft is within the first threshold distance. For example, the acceptable altitudes may decrease as the aircraft approaches the landing location. The aircraft may also slow as it approaches the landing location.

In block 1124, landing preparation and control instructions are provided to a user upon detecting that the aircraft is within the second landing threshold. The landing preparation and control instructions, in one embodiment, comprise a confidence statement.

In block 1126, the system checks whether the aircraft is within a final landing threshold of a landing location, for example 1 mile in one embodiment. While system 1100 comprises a landing sequence with three landing threshold ranges, it is envisioned that, in other embodiments a landing sequence comprises a greater number of threshold ranges, with corresponding threshold values. In other embodiments, the landing sequence comprises fewer than three threshold landing ranges.

If the aircraft is not within a final landing threshold of the landing location, in one embodiment, the steps illustrated in blocks 1122 and 1124 may repeat.

In block 1128, the system detects that an aircraft is within a final landing threshold of the landing location, for example, one mile away in one embodiment. Upon detecting that the aircraft is within a final landing threshold, in one embodiment, method 1100 may cycle through steps similar to those outlined in blocks 1106-1118. In one embodiment, the thresholds used while the craft is within the second threshold distance are different than those used while the craft is within the first threshold distance.

In block 1130, in one embodiment, upon detecting that the aircraft is within a final landing threshold range, the system presents landing preparation and control instructions to a user.

In block 1132, the system detects whether or not the aircraft has landed. In one embodiment, landing is detected automatically by internal controls of a device for providing landing instructions. In another embodiment, landing is detected automatically by internal controls of the aircraft, and reported to the system. In another embodiment, landing is detected at least based in part on input from the non-pilot user.

In block 1134, in one embodiment, in response to detection that the aircraft has landed, instructions are provided to the user to apply the brakes. Braking instructions may indicate an amount of pressure required to bring the aircraft to a stop, in one embodiment.

In block 1136, the system may determine whether the speed of the aircraft is less than a threshold value. For example, if the speed of the aircraft is not below 30 knots, a user may need to continue braking procedures, and the system may provide appropriate instructions.

In block 1138, in one embodiment, if the system detects that the speed of the aircraft is below a threshold value, instructions may be provided for shutting down the aircraft. Shut down instructions may comprise instructions for bringing the aircraft to a full stop, shutting down the electrical system of the aircraft, shutting down the aircraft engine, shutting down a fuel supply to the aircraft engine, and exiting the aircraft, in one embodiment.

In one embodiment, shut down instructions provided to a non-pilot user comprise a simplified version of those followed by a trained pilot. For a non-pilot user, instructions are provided in order to ensure that the craft is safely stabilized such that emergency medical personnel can attend to the non-pilot user and a distressed pilot.

FIGS. 12A-12H illustrate exemplary user interfaces that may be presented to a user actuating an emergency mode of the system for providing landing instructions for an aircraft in accordance with one embodiment of the present invention.

Figure 12A:
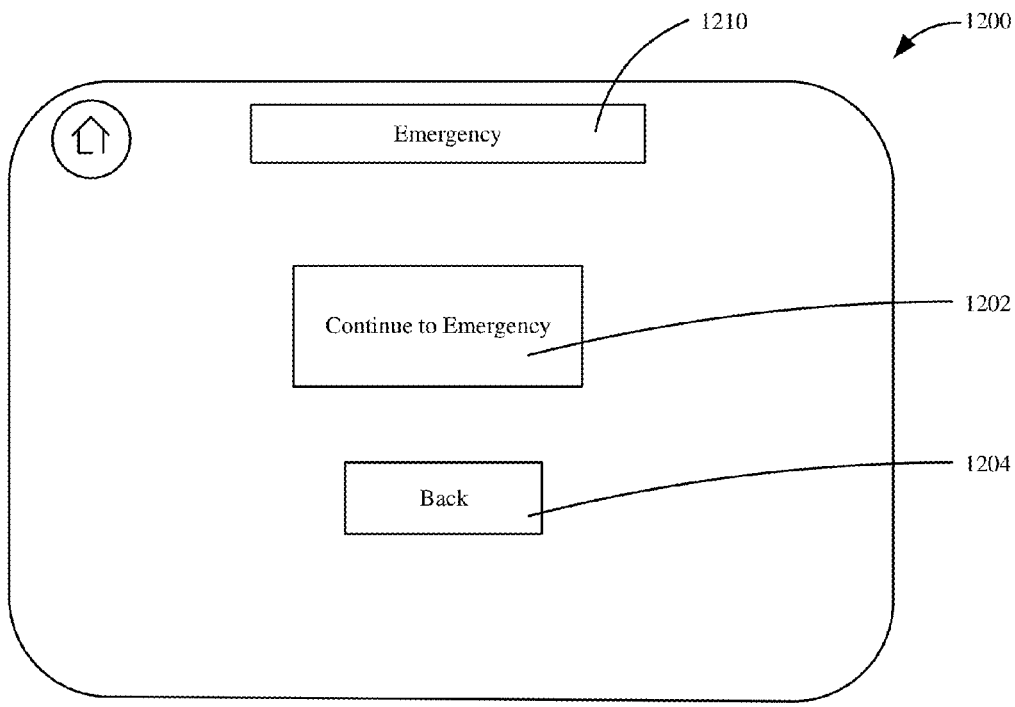
FIGS. 12A-12H illustrate exemplary user interfaces that may be presented to a user actuating an emergency mode of the system for providing landing instructions for an aircraft in accordance with one embodiment of the present invention.

FIG. 12A illustrates one example user interface 1200 that may be presented to a user entering an emergency mode of a system for providing landing instructions for an aircraft. A user may enter an emergency mode, in one embodiment, by actuating an emergency mode indication 1210, for example provided on any user interface screen of the system. In one embodiment, the emergency indication is provided on all screens presented to a user while the system is active, such that the user may enter the emergency mode at any time. However, in one embodiment, upon initially actuating an emergency indication, a user may encounter a confirmation view such as that presented in FIG. 12A. For example, it is possible, for example due to turbulence or user error, that a user may accidentally actuate emergency mode indication 1210. In one embodiment, the screen presented in FIG. 12A presents an option for the user to continue on into an emergency mode, through a continue indication 1202, or exit the emergency mode through an exit indication 1204. In one embodiment, the continue button 1202 is presented such that it takes up a greater portion of the screen than the exit portion 1204 such that a user in an emergency mode can easily confirm that an emergency is ongoing.

In one embodiment, the user still continues to see the emergency mode indication 1210, even in the emergency mode. In one embodiment, the emergency mode indication 1210 is presented differently in the emergency mode, for example, in a different color/size/style than presented in other modes of the system.

Figure 12B:
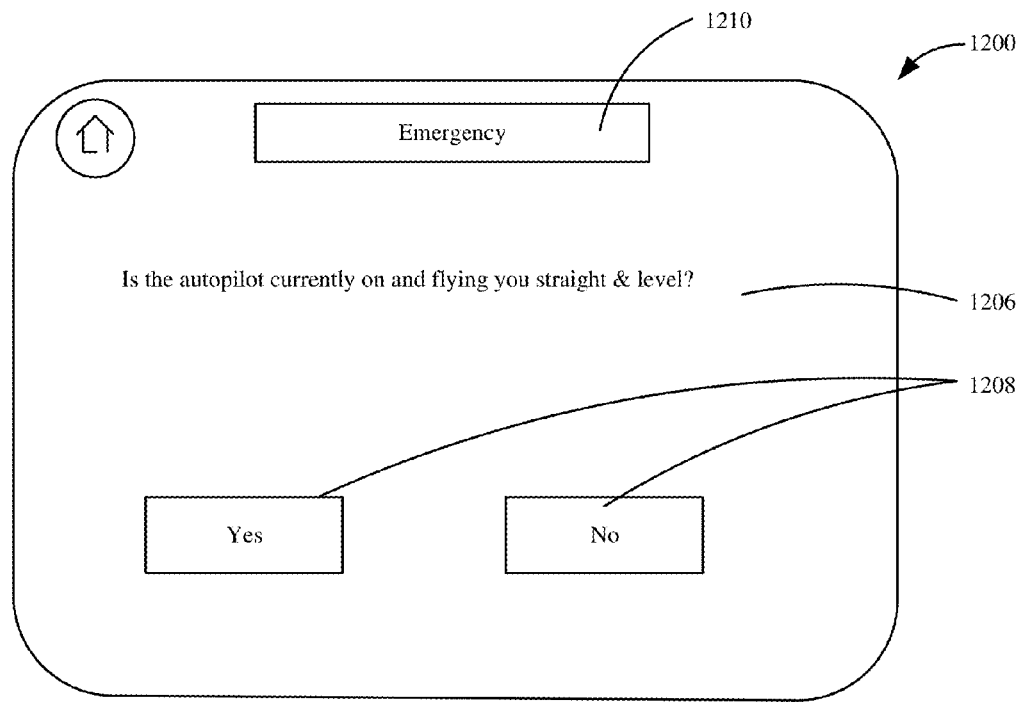

FIG. 12B illustrates one example user interface 1200 with a prompt 1206 that may be presented to a user during an emergency mode sequence. For example, for an aircraft with an autopilot mode, prompt 1206 requests the user indicate whether an autopilot is currently on and whether or not the craft is flying straight and level. The user may respond to the prompt using response options 1208. In one embodiment, the system automatically detects whether an autopilot is engaged. In an aircraft without an autopilot, the system may omit the view presented in FIG. 12B.

Figure 12C:
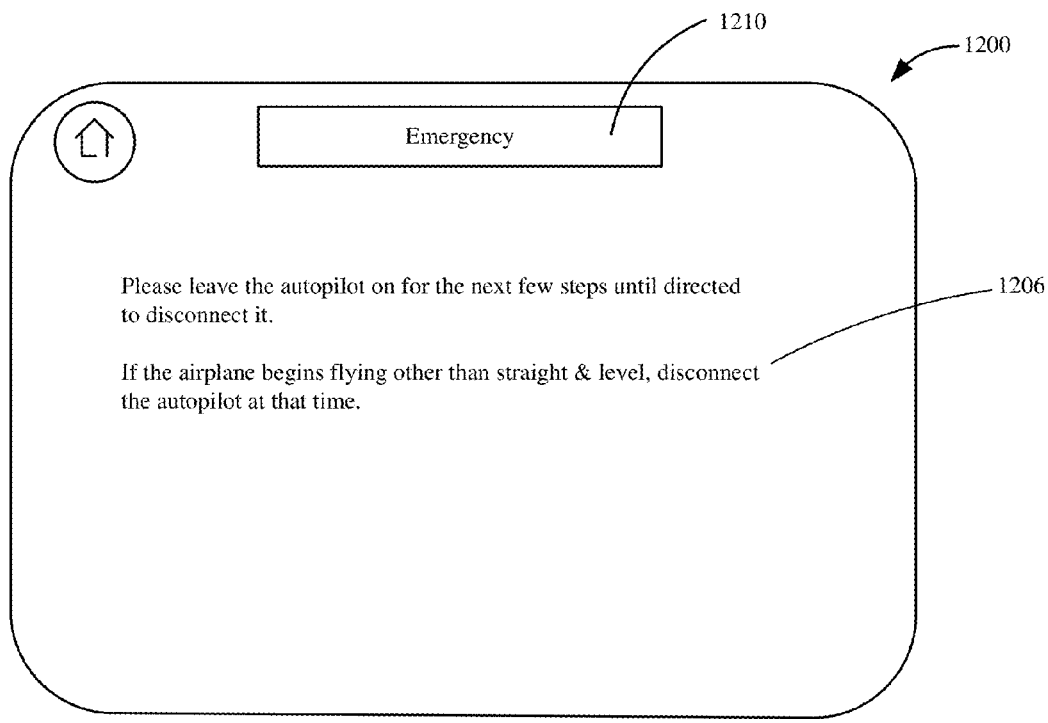

FIG. 12C illustrates one example user interface 1200 with a prompt 1206 that may be presented to a user during an emergency mode sequence, in one embodiment. In the instance where an aircraft has an autopilot, the system may instruct the user to leave the autopilot on until directed to disconnect it, in one embodiment. This may allow for a non-pilot user some time to go through an emergency tutorial to reacquaint themselves with operation of their aircraft such that they may continue to land the craft with an appropriate level of confidence. However, in at least some aircrafts, a non-pilot user will have to take manual control to complete a landing sequence.

Figure 12D:
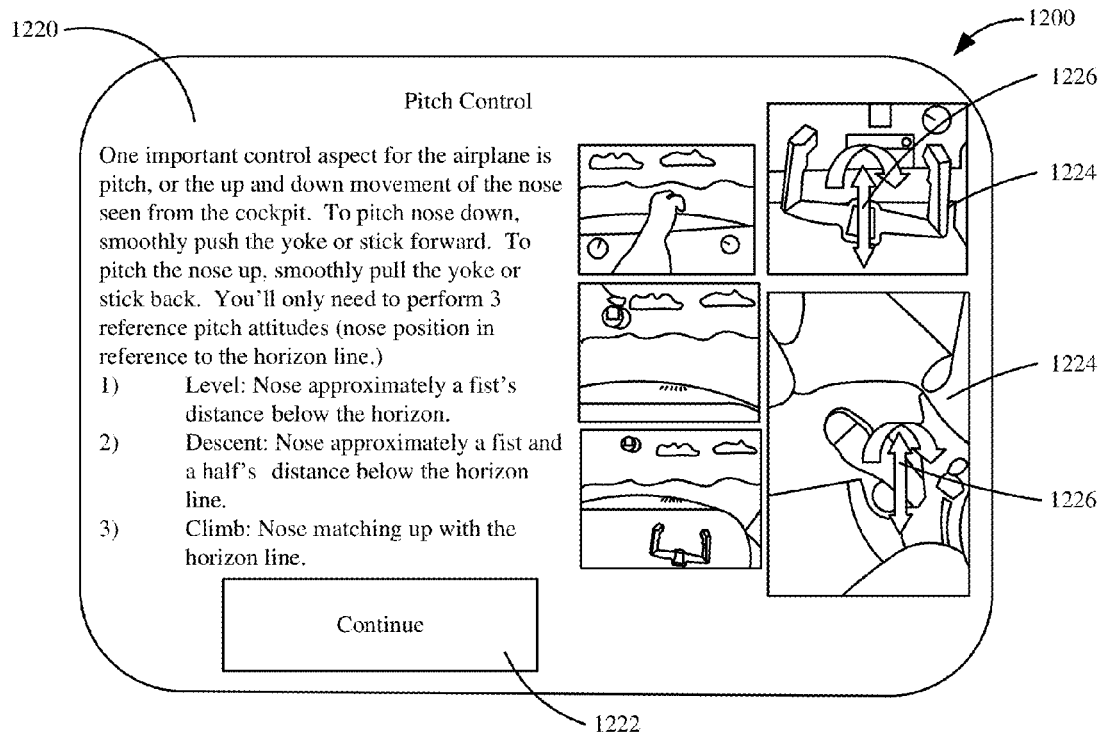

FIG. 12D illustrates one example user interface 1200 with reminder 1220 that may be presented to a user during an emergency mode sequence, in one embodiment. Reminders 1220, or emergency tutorials, may be important to ensure that a user has sufficient confidence to get the aircraft safely to the ground, in one embodiment. FIG. 12D illustrates an exemplary user interface 1200 presenting a pitch control reminder screen 1220.

Reminder 1220 may comprise, in one embodiment, a custom component indication 1224 along with one or more movement indications 1226. Custom component indication 1224 may be auto-selected by the system for providing landing instructions, for example, based on specifications entered by a user during a setup phase of the system. Custom component indications 1224 are presented, in one embodiment, to provide the closest approximation to the component that a user must interact with during the emergency landing sequence. Additionally, movement indications 1226 may indicate how to interact with component to accomplish a desired task, for example control aircraft pitch. In addition, in one embodiment, movement indications 1226 may move on interface 1200, such that they physically indicate proper component movement. For example, in one embodiment, a movement indicator 1226 may indicate a degree to which a user should pull back on a yoke to cause the aircraft to climb. Movement indicators 1226 may be important to ensure, for example, that a non-pilot user does not accidentally cause the aircraft to respond more strongly than desired while ensuring that the non-pilot user does cause the desired response of component 1224.

Reminder screens 1220 may also indicate how activating different control systems of an aircraft will change the user's view. For example, in order to adjust pitch of an aircraft, a user must change how their cockpit is oriented with reference to a horizon line. Instructions for ensuring an aircraft is descending, or climbing, relative to level may be provided, as shown in FIG. 12D, in one embodiment. Once the system presents a user with a given reminder tutorial 1220, the user may be prompted to continue to other necessary control tutorials.

Figure 12E:
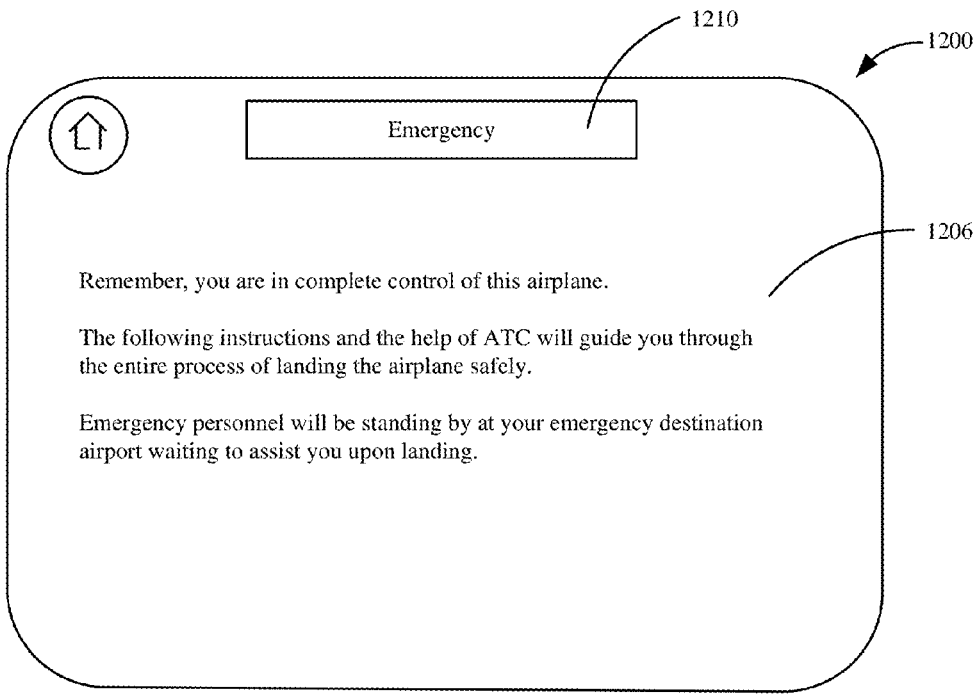

Periodically, throughout an emergency mode sequence, the system may provide one or more confidence messages to a user, for example, as shown in FIG. 12E. Such confidence prompts 1206 may help ensure that a non-pilot user remains calm during the emergency mode sequence.

Figure 12F:
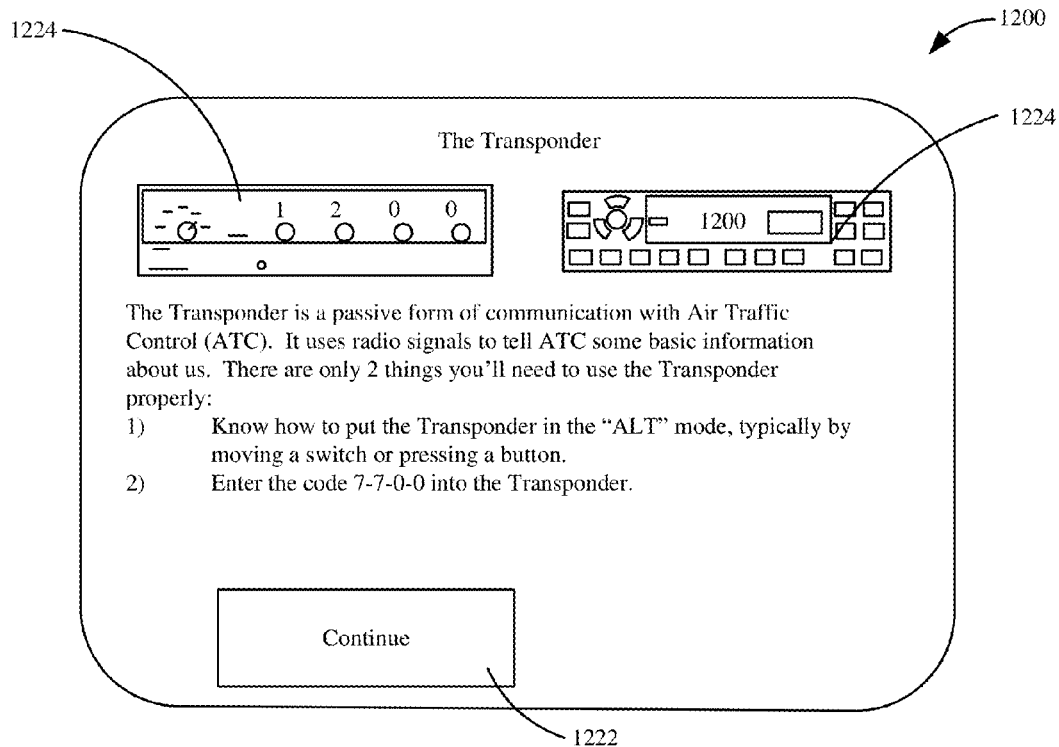

One of the more important steps in an emergency mode sequence is communicating with an air traffic controller (ATC). The ATC may be important to ensure that emergency medical services are available upon the aircraft landing. Additionally, ATC may also be crucial to redirect other air traffic away from a distressed aircraft. However, in order to contact an ATC, a user may need to alter settings on a transponder, or other communication system. A quick tutorial 1220 on how to use the transponder is provided, in one embodiment, for example as shown in FIG. 12F. A custom component indicator 1224 is provided, in one embodiment. FIG. 12F shows two examples of a transponder component 1224, however, in one embodiment, after a user has entered specifications for their aircraft, only the indication 1224 specific to their aircraft is shown. Information on how to use their specific transponder may also be provided, in one embodiment.

Figure 12G:
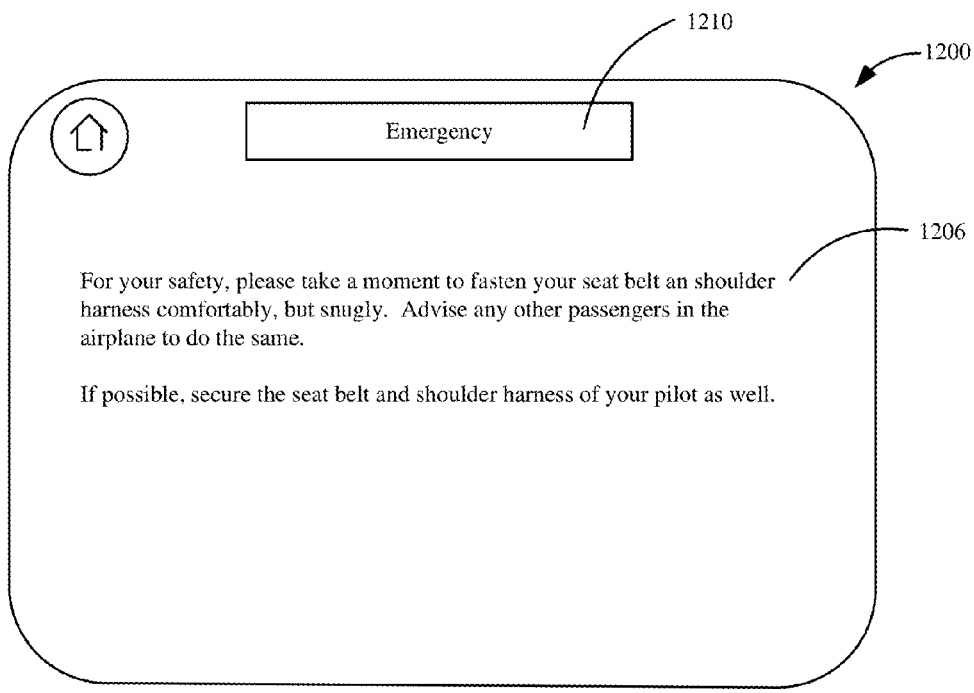
Figure 12H:
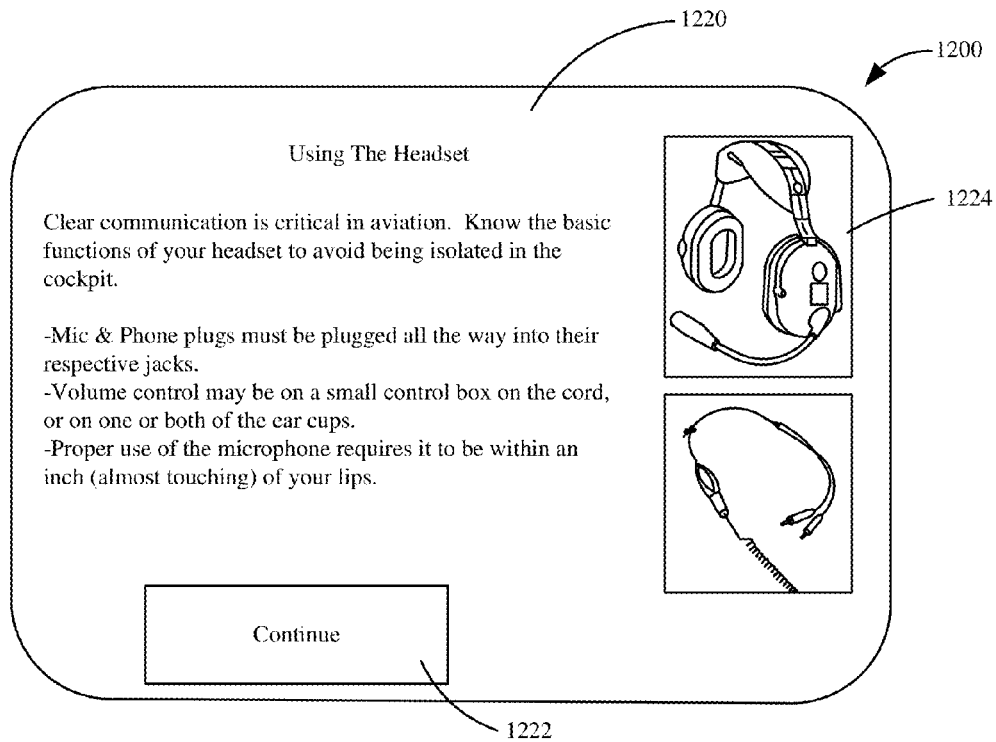

FIG. 12G illustrates one example user interface 1200 with a reminder 1220 that may be presented to a user during an emergency mode sequence, in one embodiment. For example, as shown in FIG. 12G, the system may provide a reminder 1220 to secure all safety features for themselves, and if possible, a distressed or incapacitated pilot, in one embodiment.

Figure 13:
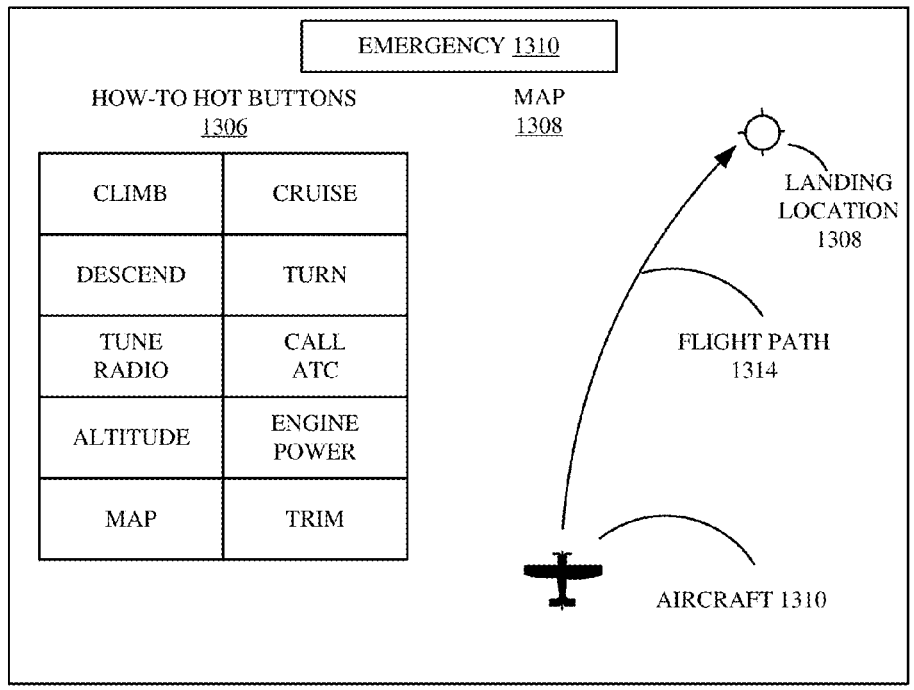
FIG. 13 illustrates an exemplary user interfaces that may be presented to a user in an emergency mode of the system for providing landing instructions for an aircraft in accordance with one embodiment of the present invention.

FIG. 13 presents an exemplary emergency view 1300 that may be presented to a user in an emergency mode sequence. While in an emergency mode, in one embodiment, a user interface screen 1300 may provide a user with a plurality of command options 1306. Each command option 1306 corresponds, in one embodiment, to necessary instructions for controlling an aircraft. For example, as shown in FIG. 13, quick control reminders may be accessed by selecting a command option 1306 for instructing the aircraft to climb, descend, cruise, or turn. Additionally, command options may be provided in order to remind a user how to, for example: tune the radio, call air traffic control, change an altitude of the craft, change an engine power, view a map, or adjust a trim of the aircraft. Additionally, while in an emergency mode, user interface 1300 may also provide a user with a map 1308 such that they can visually see where the aircraft is in relation to a designated landing location 1308. The aircraft 1310 may be shown in conjunction with a projected flight path 1314, in one embodiment.

FIGS. 14A-14F illustrate some exemplary user interfaces that may be presented to a user setting up an emergency landing in an emergency mode of the system for providing landing instructions for an aircraft in accordance with one embodiment of the present invention. One of the most important steps for a non-pilot user in an emergency is establishing communication with ATC to ensure that the sky is clear for the distressed aircraft, and appropriate emergency medical services are available at the landing site. For example, the system for providing landing instructions is not designed, in one embodiment, to ensure that an aircraft lands unharmed, therefore a risk of fire or other structural damage is possible. Contacting ATC is necessary in order to ensure that fire and rescue services are on standby. Additionally, as the emergency mode is only entered when a pilot cannot fly, emergency medical services may also be necessary in order to attend to a distressed or incapacitated pilot upon landing. Therefore, as soon as a craft is flying level, for example by an autopilot or after system prompting to a non-pilot user, the system may then instruct the user on how to communicate with ATC.

Figure 14A:
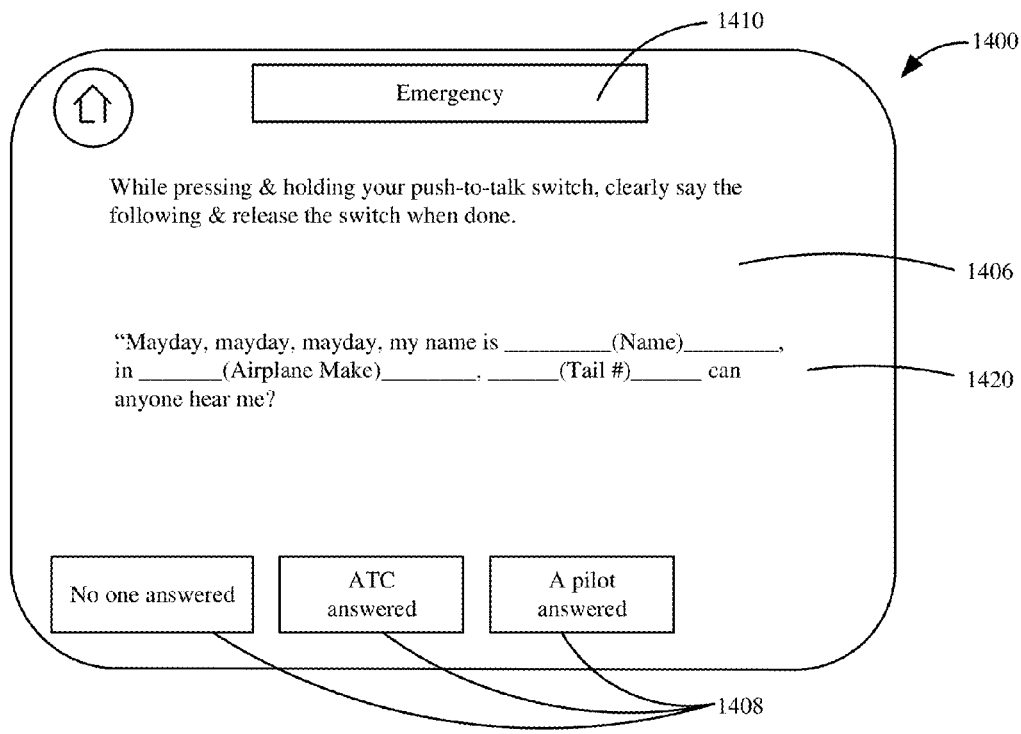
FIGS. 14A-14F illustrate some exemplary user interfaces that may be presented to a user setting up an emergency landing in an emergency mode of the system for providing landing instructions for an aircraft in accordance with one embodiment of the present invention.

FIG. 14A illustrates an example prompt 1406, with script 1420 that may be presented to a user during an emergency mode sequence, in one embodiment. User interface 1400 may, in one embodiment, comprise an emergency indication 1410 indicating that an emergency mode is active, as opposed to, for example, a tutorial mode. In one embodiment, script 1402 populates based on information previously entered by a user, for example in an initial setup of the system for providing landing instructions. User interface 1400 may also comprise one or more response options 1408 for the user to select based on whether or not a response was received.

Figure 14B:
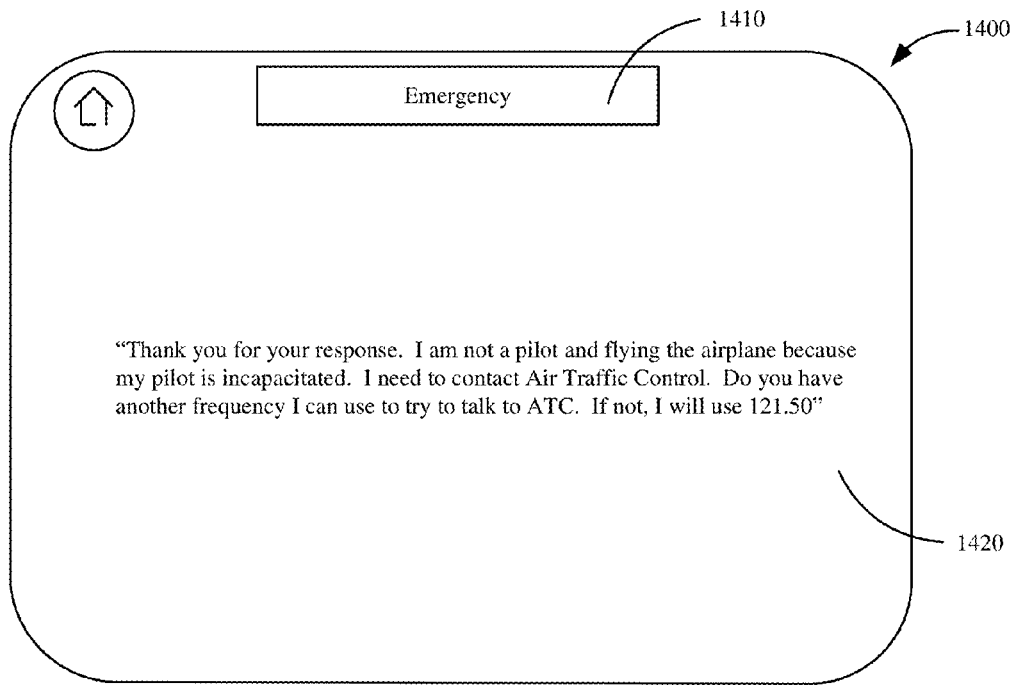

FIG. 14B illustrates an exemplary user interface 1400 that may be presented to a user indicating that a pilot answered a distress call. Interface 1400 may show another script 1420, in one embodiment, populated based on specifications previously provided. Upon contacting another pilot, the system prompts the user to determine how to contact ATC directly. Therefore, script 1420 may prompt the user, in one embodiment, to ask the pilot for a correct frequency, or other appropriate communication mechanism for contacting ATC directly.

Figure 14C:
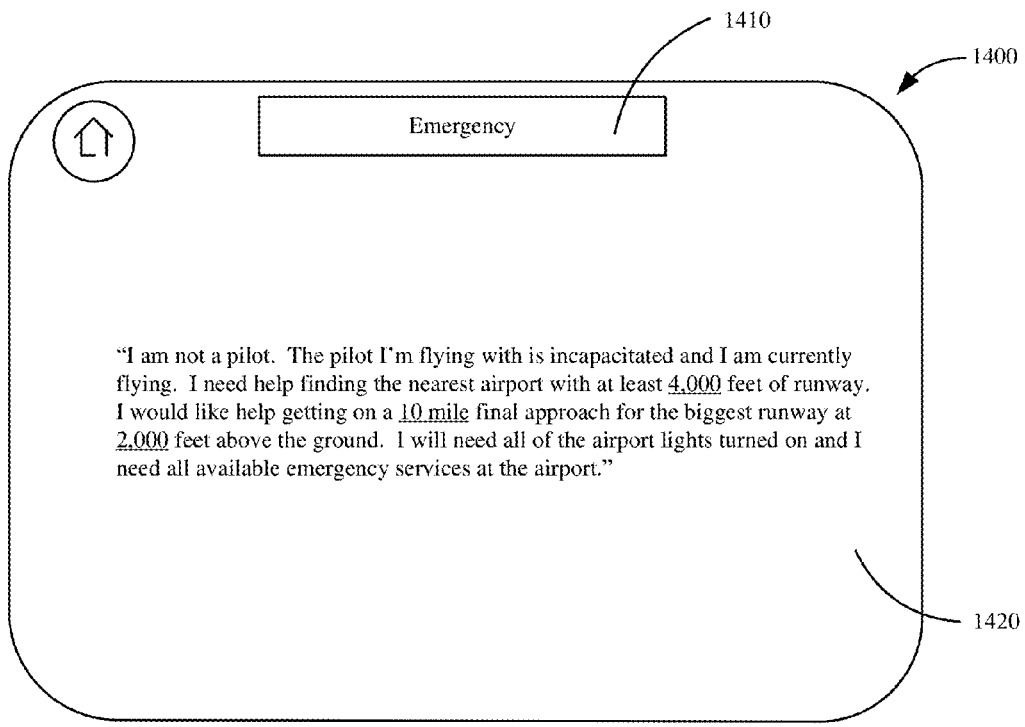

FIG. 14C illustrates an exemplary user interface 1400 that may be presented to a user indicating they were able to reach ATC. Script 1420 may be auto-populated, in one embodiment, based on detected information about the aircraft, for example based on specifications previously entered. For example, a length of runway needed for a given aircraft is dictated at least in part on the size of the aircraft. As a non-pilot may not know the exact length of runway necessary for their given aircraft, such information is calculated, and automatically populated into script 1420, by the system based on known information about the aircraft. For example, for a given aircraft, at least 4000 feet of runway is needed, at a 10 mile final approach, for 2000 feet above the ground. Script 1420 may also remind the user to request emergency services, to be coordinated by ATC.

Figure 14D:
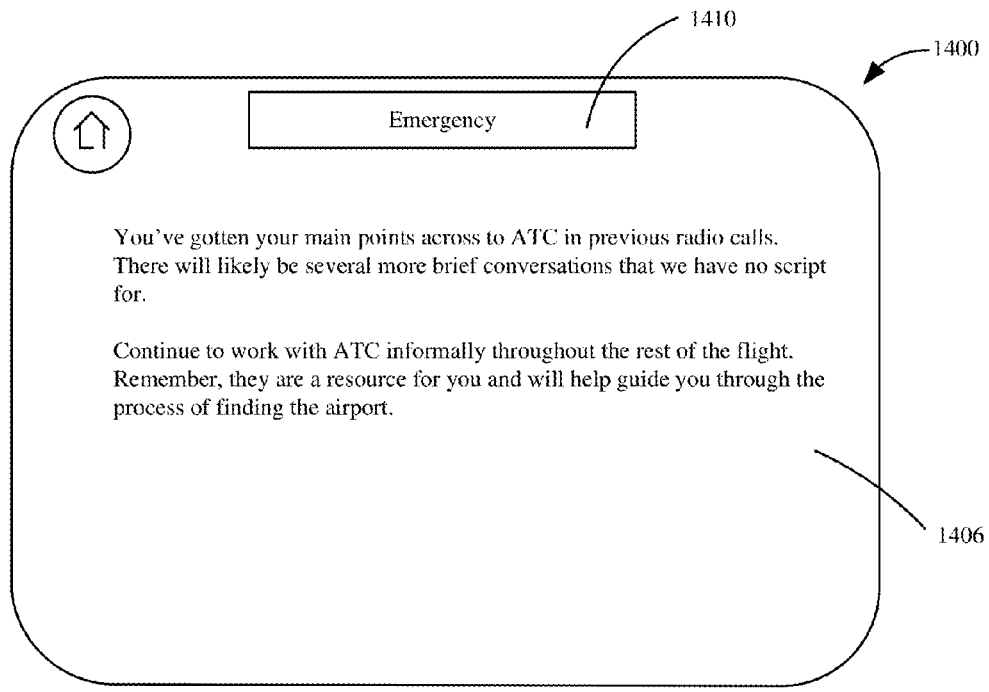

Beyond the initial script, ATC may have additional questions based on a specific emergency situation. Therefore, after going through an initial script, a prompt 1406 may be presented on a user interface 1400, for example as shown in FIG. 14D, reminding a user to continue communicating with ATC.

Figure 14E:
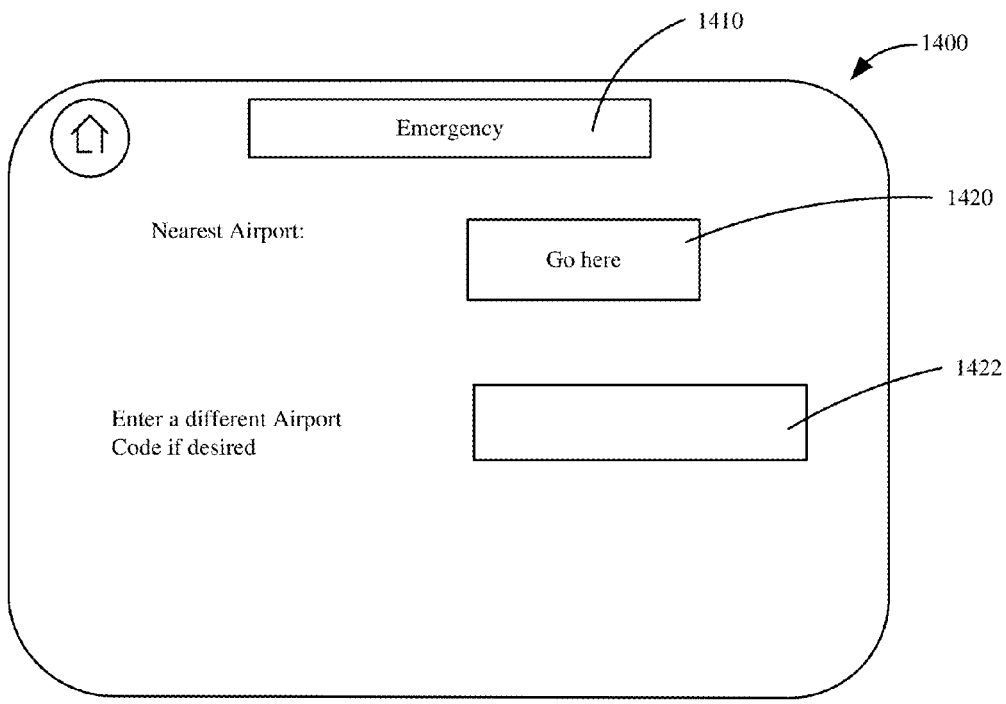

FIG. 14E illustrates one example user interface 1400 that may be presented to a user selecting an airport for landing. Interface 1400 of FIG. 14E may be presented to a user, in one embodiment, after ATC has been contacted, or in another embodiment, after attempts to contact ATC have failed. It is preferable for a user to contact ATC prior to attempting a landing, in order to ensure that emergency medical services for the pilot and the non-pilot passenger are available upon landing. However, if ATC cannot be reached, or does not provide the user with instructions for a specific airport, the system for providing landing instructions may, in one embodiment, assist a user in finding and landing at the nearest airport, or nearest suitable landing area. For example, it is possible that a user may be flying in an area where an airport is not available, or in an area where sufficient fuel cannot allow the non-pilot to achieve a nearest airport. Therefore, the system may assist the user in landing, for example, in the nearest suitable field. However, it is desired for a user to land at an airport, in order for emergency medical services and other rescue services to be available as soon as possible.

In one embodiment, the system may automatically populate a nearest suitable airport, and a user may confirm the selection by actuating a "nearest airport" indication 1420. However, if a user wants to go to a different airport, the user may, in one embodiment, select another airport, for example using an airport entry indication 1422. For example, the nearest airport may not be in the city with easy access to a hospital. Depending on the type of distress being experienced by the pilot, the non-pilot user may prefer to travel an extra distance in order to go to a larger metropolitan area. The user may be able to select the airport of their choice, in one embodiment, using the interface 1400 presented in FIG. 14E. In an embodiment where ATC is contacted, the system may facilitate generating a flight path for the non-pilot user based on ATC instructions. In one embodiment, the airport entry indication 1422 comprises an audible indication.

Figure 14F:
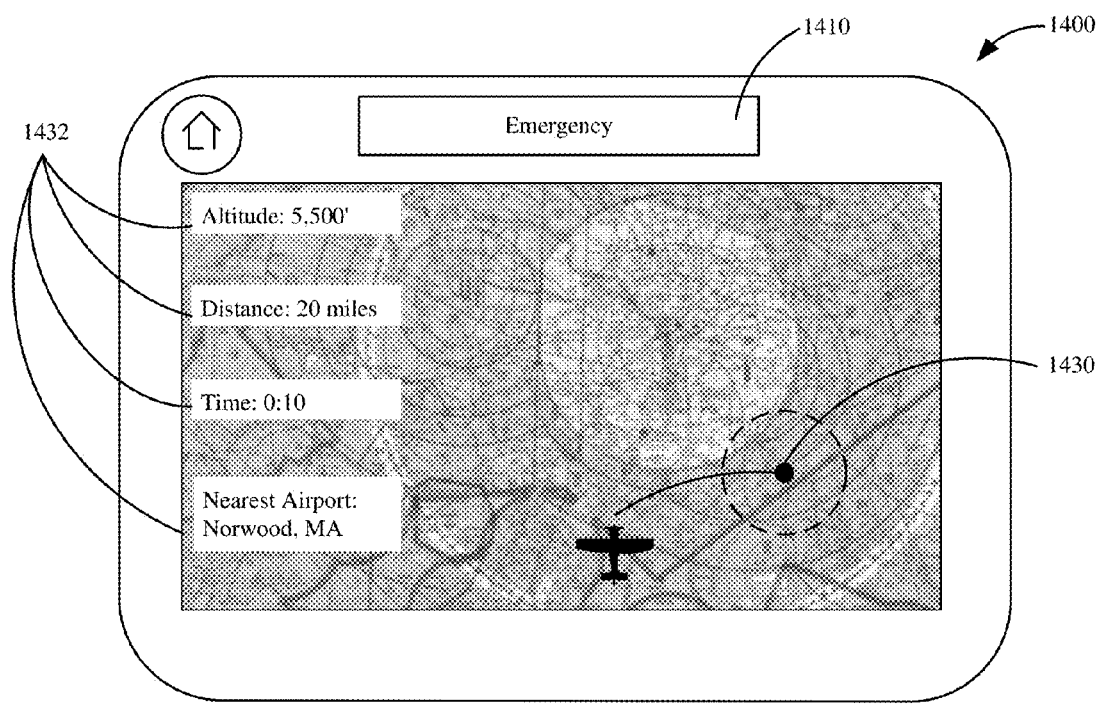

FIG. 14F illustrates an example interface 1400 that may be presented to a user once an airport has been selected, in one embodiment. In one embodiment, interface 1400 comprises a map, showing both the user's location, and the location of a nearest airport 1430. Additionally, flight specifications 1432 may also be provided, in one embodiment. Interface 1400 presented in FIG. 14F may, in one embodiment, be presented similarly to a map view presented in a fly along mode of the system. This may be helpful, as it presents a non-pilot user with a familiar interface. This may improve user confidence.

Figure 15A:
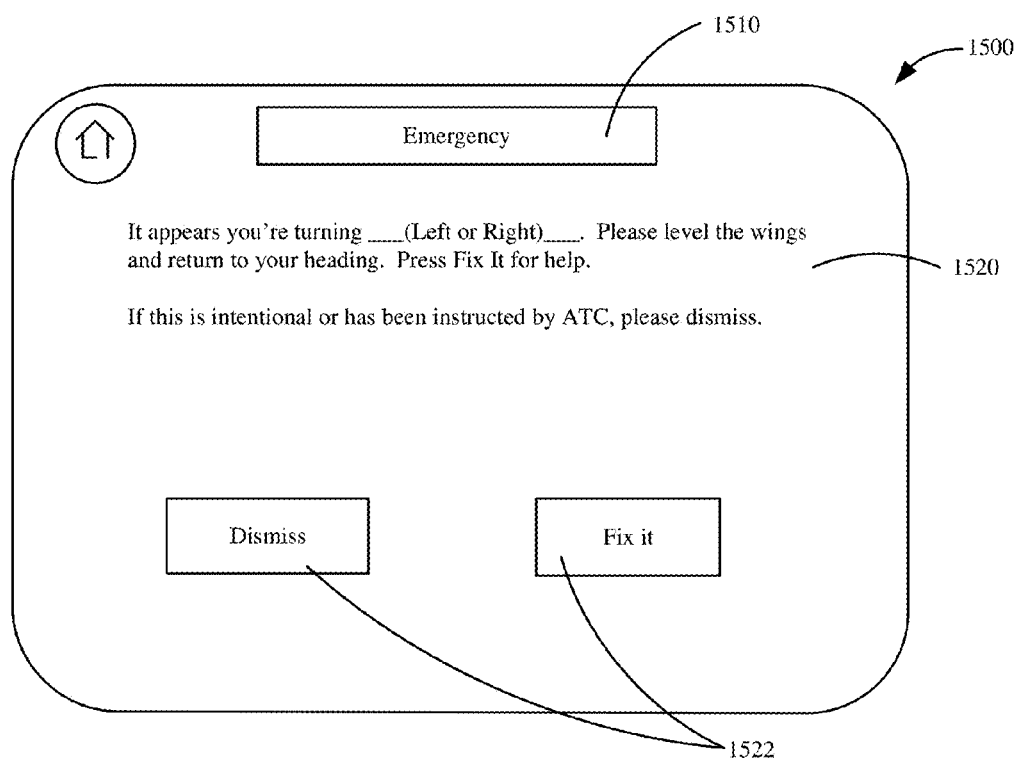
FIGS. 15A-15D illustrate some exemplary user interfaces that may be presented to a user after triggering an alert in an emergency mode of the system for providing landing instructions for an aircraft in accordance with one embodiment of the present invention.

FIGS. 15A-15D illustrate some exemplary user interfaces that may be presented to a user after triggering an alert in an emergency mode of the system for providing landing instructions for an aircraft in accordance with one embodiment of the present invention. FIG. 15A illustrates an example alert 1520 that may be presented to a user on a user interface 1500, in one embodiment. In one embodiment, the system presents an alert to a user who has exceeded a threshold value, or gone outside a threshold range, for a flight parameter, for example altitude or flying direction. The alerts are configured to be presented, for example as shown in FIG. 15A, such that they are easy to read and clearly indicate which threshold (or thresholds, in one embodiment) has been triggered. In one embodiment, the alert provides access to instructions to fix the indicated problem.

In one embodiment, the system presents an alert comprising a response option 1522 to dismiss the alert. For example, ATC may give the user a direct command on how to fly the aircraft. This may be a command that is not anticipated by, or different from a provided command by the system. In such a scenario, it may be distracting for an alert to be presented continuously to a user, so the user may be able to dismiss the alert. In FIG. 15A, the alert is presented indicating that a user is turning off a desired flight path. The direction that the user is turning, for example left or right may be auto-populated based on a detected trajectory change by the system.

Figure 15B:
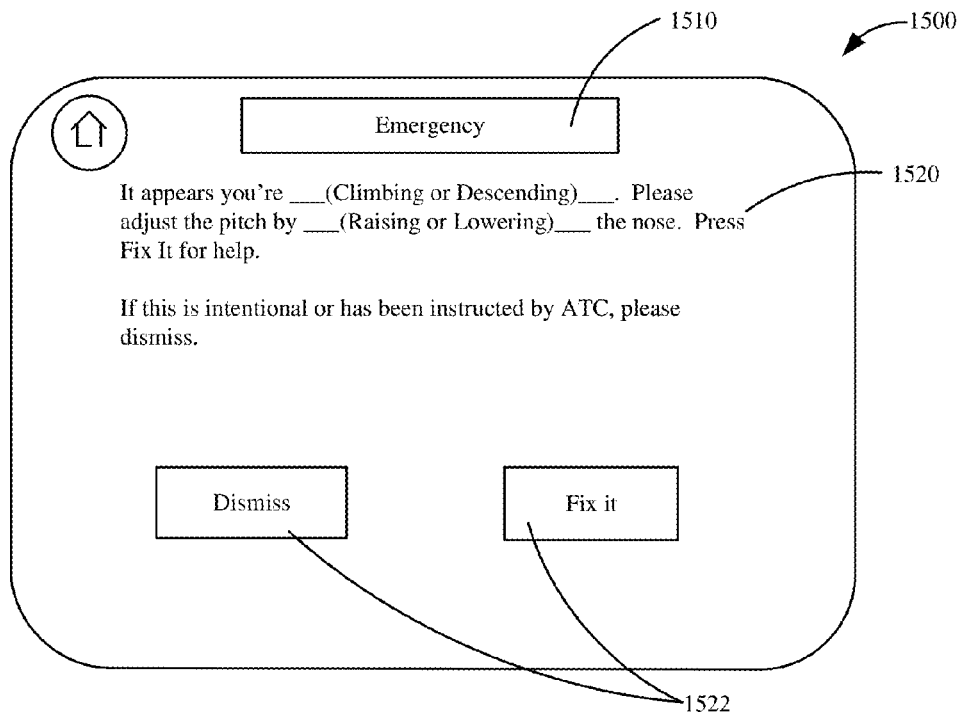

FIG. 15B illustrates another example alert 1520 that may be presented to a user on a user interface 1500. Alert 1520 may be presented, for example as shown in FIG. 15B, when an unanticipated, or greater-than-expected altitude change is detected by the system. For example, the system may inform the user that they are climbing, which can be fixed by adjusting the pitch and lowering the nose. If the user does not remember, or know, how to make such an adjustment, in one embodiment, they may actuate a "fix it" response option 1522 and the system will provide prompts on how to return the aircraft to the intended flight plan.

Figure 15C:
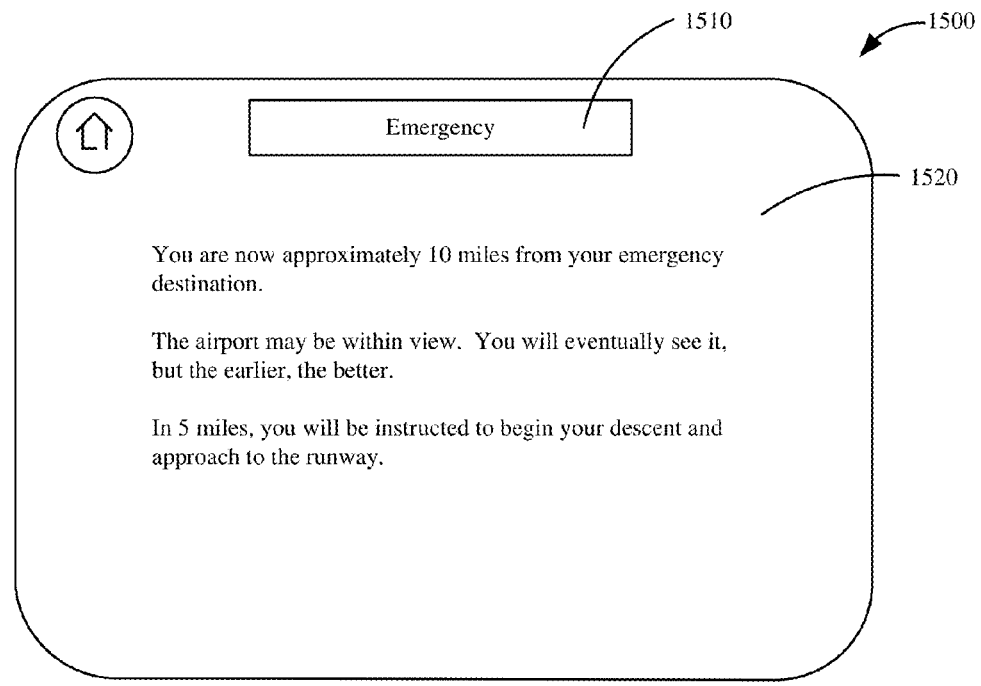

FIG. 15C illustrates an example alert 1520 that may be presented to a user on a user interface 1500 indicating that the aircraft is nearing an emergency destination. Alert 1520 may be presented in addition to a confidence message, in one embodiment.

Figure 15D:
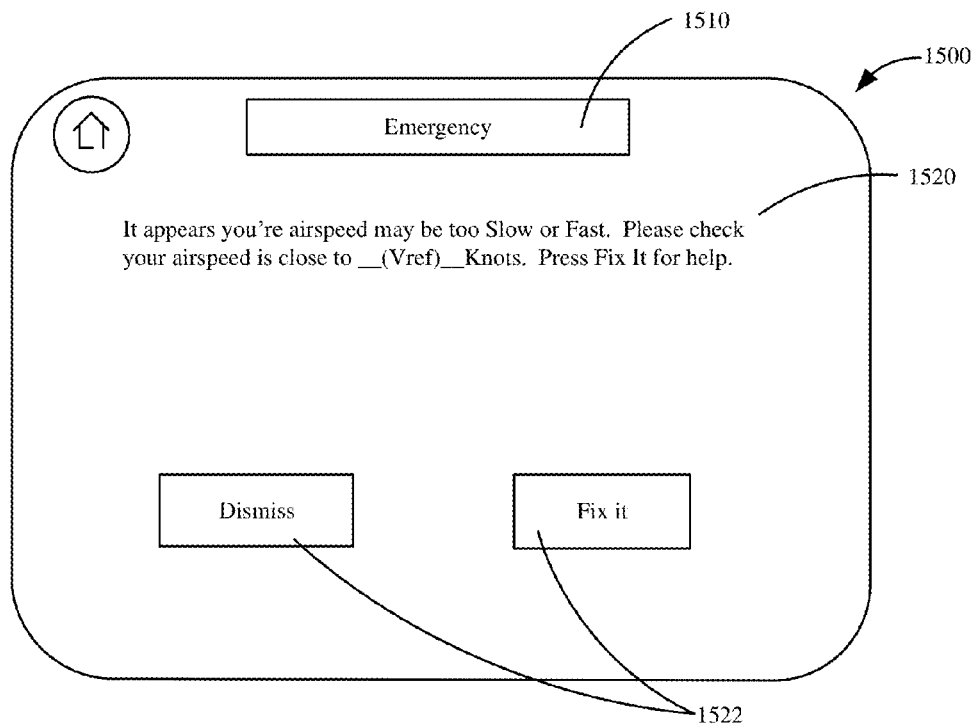

FIG. 15D illustrates an exemplary alert 1520 presented to a user whose speed has exceeded a threshold range. The desired landing approach air speed, $V_{ref}$, may be auto-populated based on a previously entered aircraft specification. For example, different aircraft are required to land at different air speeds, based on the size of the aircraft. A minimum speed threshold is required in order to ensure that the craft stays airborne during the landing process. However, if the aircraft is approaching the landing too quickly, the runway may not be long enough to accommodate the landing. Therefore, the air speed desired for a given craft's landing, is dependent on a variety of factors, all of which are taken into account by the system for providing landing instructions in auto-populating prompt 1520 and FIG. 15D.

FIGS. 16A-16G illustrate some exemplary user interfaces that may be presented to a user landing an aircraft in an emergency mode of the system for providing landing instructions for an aircraft in accordance with one embodiment of the present invention. In one embodiment, the system for providing landing instructions is configured with the goal in mind of bringing the aircraft to the ground with a passenger and/or non-pilot user and an incapacitated pilot safe upon landing. Therefore, instructions are provided with thresholds sufficient to get the craft to the ground such that its passengers survive the landing, even though it may result in significant damage to the aircraft itself.

Figure 16A:
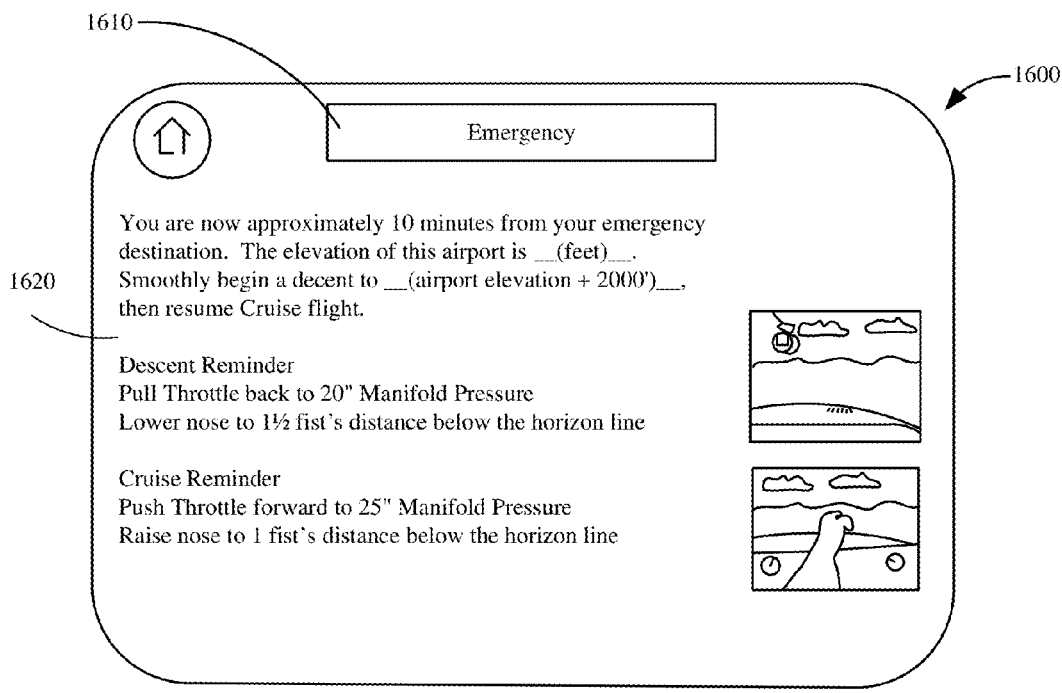
FIGS. 16A-16G illustrate some exemplary user interfaces that may be presented to a user landing an aircraft in an emergency mode of the system for providing landing instructions for an aircraft in accordance with one embodiment of the present invention.

FIG. 16A illustrates an example user interface 1600 with an emergency indication 1610 that may be presented to a user landing an aircraft in an emergency mode. Emergency indication 1610 may indicate that a user is still in an emergency mode. Interface 1600 may also comprise a prompt 1620. Prompt 1620, may indicate a distance, in one embodiment, for example presented in either miles or minutes away, from a landing location. An elevation of the airport may be provided, for example, auto-populated based on information accessed from an FAA database, another source, or calculated based on avionics systems within the aircraft. Prompt 1620 may comprise, in one embodiment, instructions for descending the aircraft to the elevation of the airport plus a landing altitude. For example, in one embodiment, an aircraft should approach a landing location at 2000 feet above the airport elevation.

In one embodiment, prompt 1620 may also comprise information on how to cause the aircraft to descend to the desired altitude, and how to reengage an autopilot, or cruise control of the aircraft. Prompt 1620 may also be accompanied by one or more images in order to assist the non-pilot user in achieving the desired altitude.

Figure 16B:
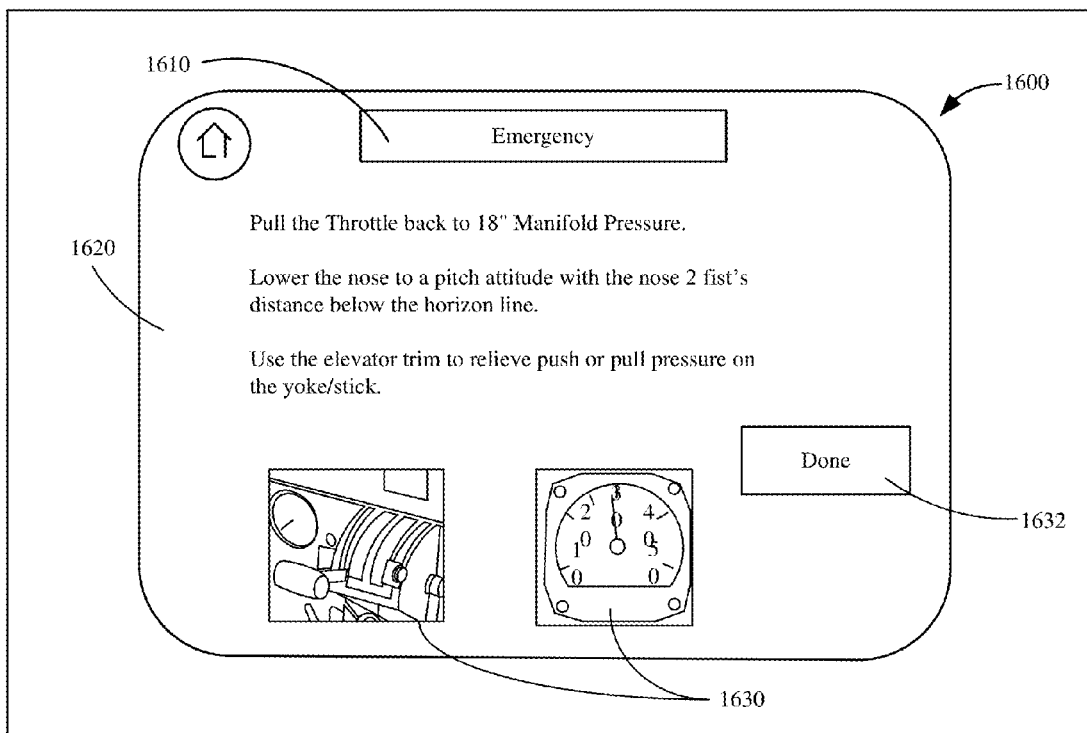

FIG. 16B illustrates one example user interface 1600 that may be presented to a user landing an aircraft in an emergency mode. User interface 1600 may comprise, in one embodiment, one or more custom component indications 1630. In one embodiment, component indications 1630 auto-populate based on previously entered, or currently detected, specifications of a given aircraft. Prompt 1620 may, in one embodiment, comprise instructions on how to adjust, for example, an aircraft pitch, and/or elevator trim. In one embodiment, once the user has made the desired adjustments, the system automatically moves onto the next required step in the landing sequence. In another embodiment, once the user has made the necessary changes, a user may actuate a change completed option 1632.

Figure 16C:
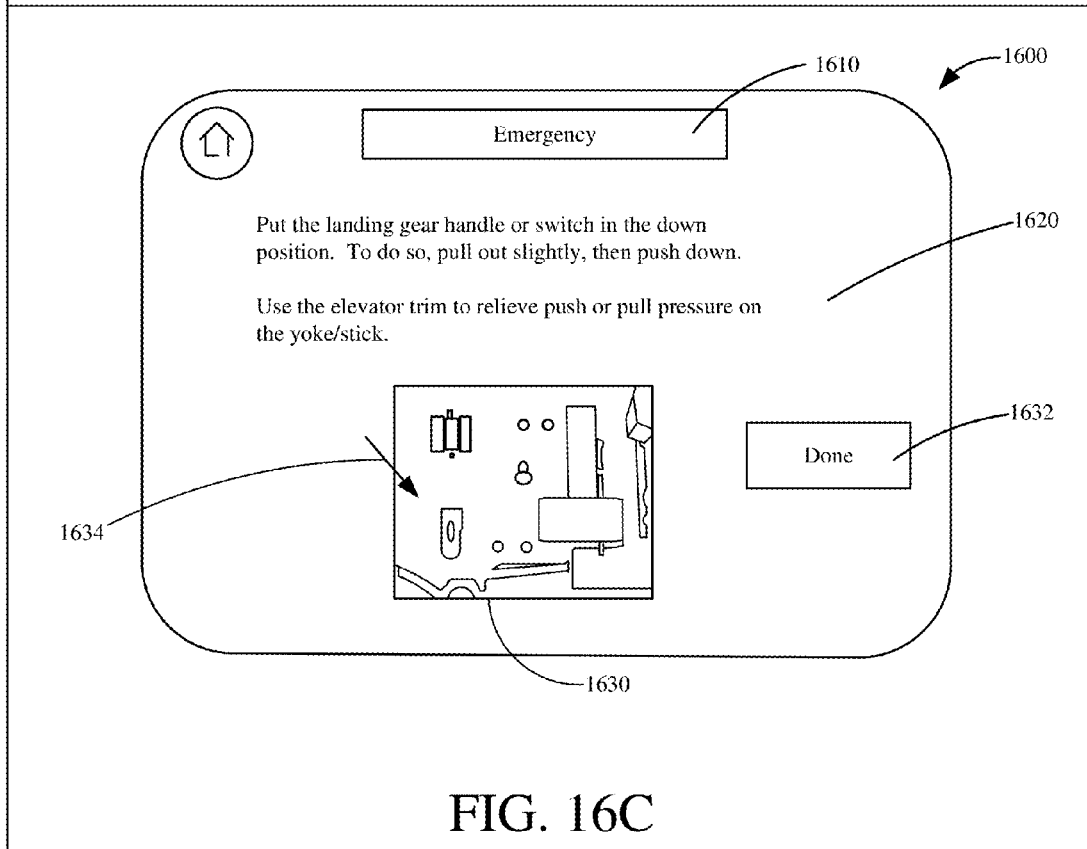

FIG. 16C illustrates an example user interface 1600 that may be presented to a user landing an aircraft, providing instructions for landing gear deployment, in one embodiment. In one embodiment, in scenario where an aircraft does not have deployable landing gear, the instructions of FIG. 16C are omitted.

Figure 16D:
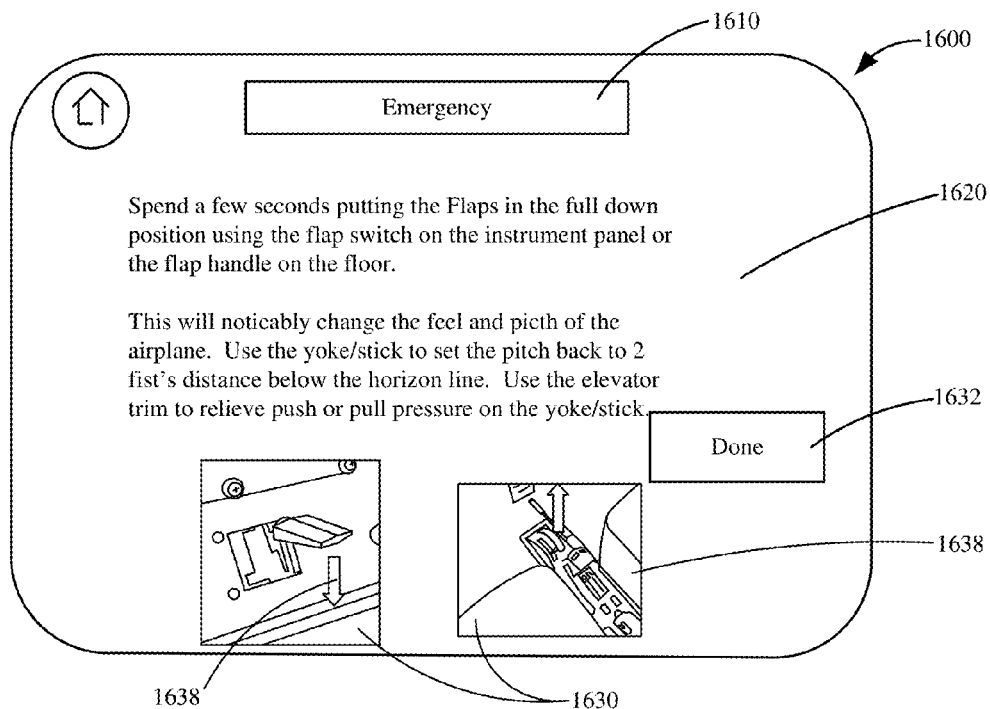

FIG. 16D illustrates one example user interface 1600 that may be presented to a user landing an aircraft in an emergency mode, showing a prompt 1620 instructing a user on adjusting flaps to a full down position. However, in one embodiment, if an aircraft does not have flaps, or if it has flaps that automatically adjust, user interface 1600 of FIG.

16D is omitted. Movement indications 1638 are presented, in one embodiment, with a component indicator 1630.

Figure 16E:
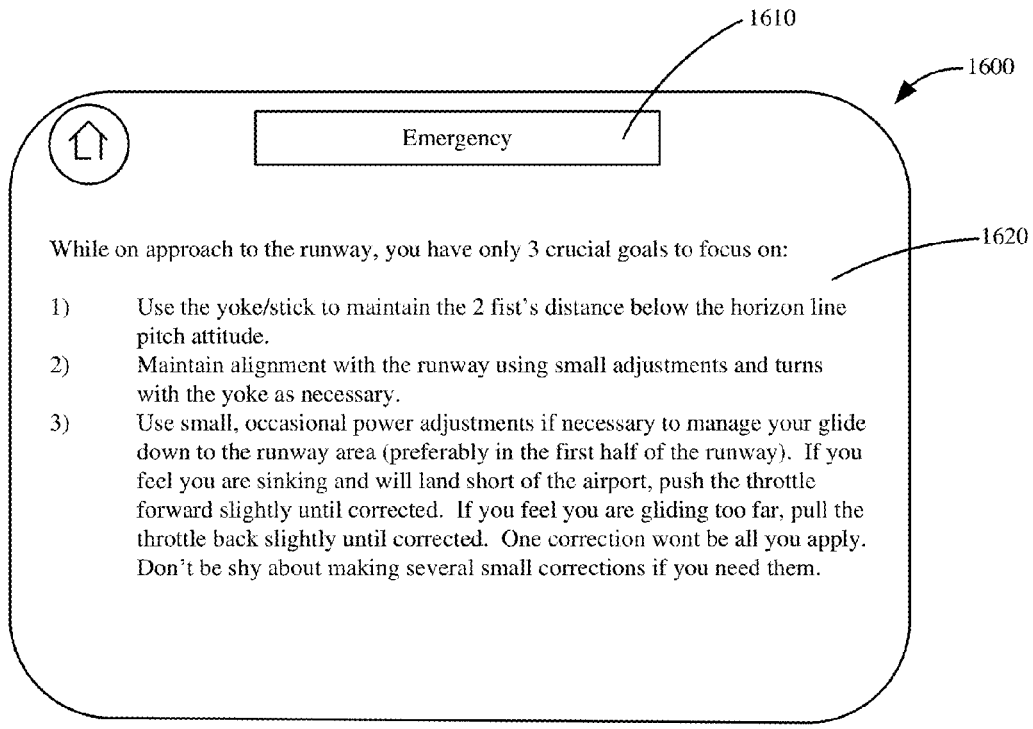
Figure 16F:
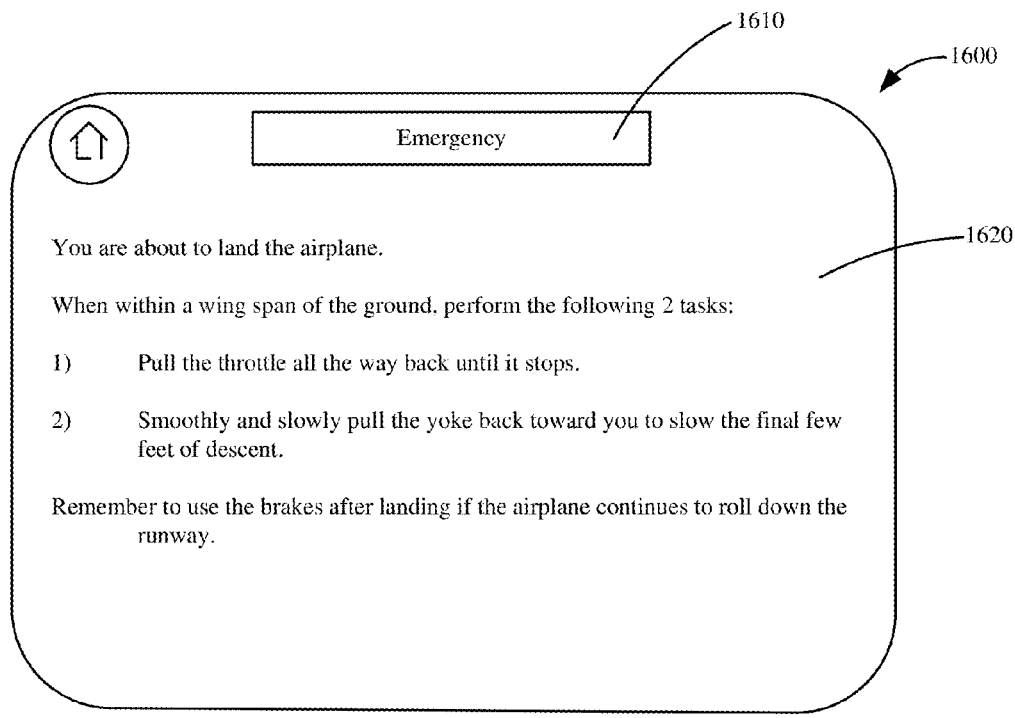

FIGS. 16E and 16F illustrate examples of user interfaces 1600 that may be presented to a user landing an aircraft in an emergency mode. The purpose of presenting confidence messages, for example those presented in FIGS. 16E and 16F may be, in one embodiment, to increase confidence of a non-pilot user. In one embodiment, messages such as those illustrated in FIGS. 16E and 16F may be presented in order to minimize damage to an aircraft and increase the likelihood of passengers surviving the landing. However, in one embodiment, the system is designed to get a user close enough to the ground such that damage to the craft will not risk the life of the non-pilot user, or an incapacitated pilot.

Figure 16G:
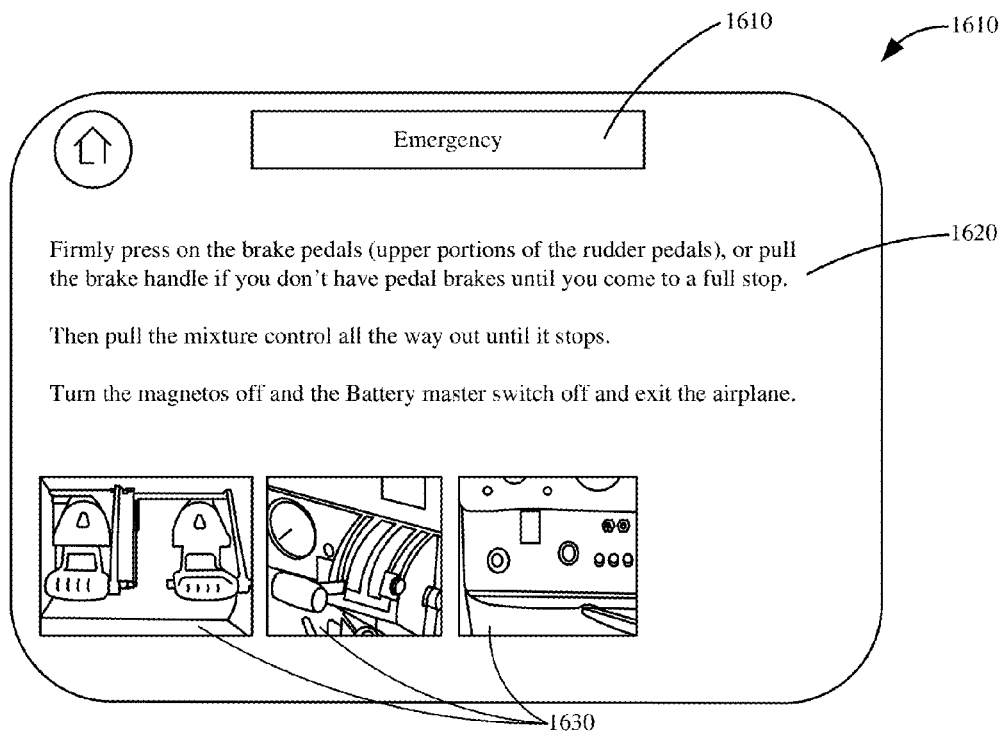

FIG. 16G illustrates one example user interface 1600 that may be presented to a user landing an aircraft in an emergency mode. For example, in one embodiment, such as that illustrated in FIG. 16G, the system provides the user with final instructions for completing a landing of the aircraft, and shutting off relevant systems. In one embodiment, the shutdown procedure presented to a non-pilot user is a simplified one, designed only to minimize further risk to the non-pilot user, incapacitated pilot, or emergency medical services. For example, prompt 1620 presented on FIG. 16G may only comprise information on how to turn off electrical systems, propulsion systems, and fuel systems of the aircraft, omitting other shutoff procedures.

Information described herein may be provided by a number of sources. Some information may be auto-populated based on download or access to FAA databases, for example airport lists and suitable non-airport landing areas, for example parks and fields. Additionally, craft make and model information may also be accessible by manufacturer, FAA, or another exemplary database. However, in other embodiments, other sources of information are used to provide data points for use by the systems and methods described herein.

Systems and methods designed herein are provided in order to allow non-pilot users in a variety of aircraft makes and models to successfully land an aircraft in an emergency scenario. One goal of systems and methods provided herein is to increase the chances that the non-pilot user and an incapacitated pilot are safely provided to the ground. Some example thresholds, for example altitude and speeds have been provided herein. However, it is to be understood that these are by example only, and that in other embodiments, and other sizes of aircrafts, different thresholds may be calculated and provided by the systems and methods described herein in order to ensure that a non-pilot user and a pilot are provided safely to the ground.

Additionally, provided herein are some examples of images and user interfaces that may be presented to a user in accordance with systems and methods described herein. However, it is to be understood that these images are by example only, and other images or user interfaces may be used depending on the detected aircraft in which a non-pilot user is flying.

Although the present invention has been described with reference to preferred embodiments, workers skilled in the art will recognize that changes may be made in form and detail without departing from the spirit and scope of the invention.

What is claimed is:

1. A method for providing landing instructions, comprising:
   detecting, utilizing a navigational system, a current location of an aircraft;
   selecting a landing location for the aircraft;
   providing a sequence of approach instructions for executing an approach sequence;
   providing a sequence of landing instructions for executing a landing sequence, wherein providing the sequence of landing instructions comprises:
   detecting a flight parameter for the aircraft;
   comparing the detected flight parameter to a threshold flight parameter; and
   providing, upon detection that the detected flight parameter is outside an acceptable parameter range, an indication to the operator; and
   wherein the provided instructions comprise a controller selecting custom indications based on specifications for the aircraft and presenting the custom indications to an operator of the aircraft.

2. The method of claim 1, wherein the navigational system comprises a global positioning system.

3. The method of claim 1, wherein selecting a landing location comprises:
   detecting a plurality of potential landing locations within a proximity of the detected current location;
   ranking the plurality of potential landing locations based on an estimated flight distance from the detected current location;
   presenting a landing location to the operator based on the ranking of potential landing locations; and
   wherein potential landing locations are removed from the ranking of potential landing locations based at least in part on the specifications for the aircraft.

4. The method of claim 1, and further comprising:
   providing a sequence of shutdown instructions for shutting down an aircraft.

5. The method of claim 1, and further comprising:
   providing instructions for establishing communication with an air traffic control.

6. The method of claim 1, wherein the provided indication comprises instructions for addressing the detected flight parameter to the operator.

7. A device configured to provide instructions for controlling an aircraft, the device comprising:
   a navigation component configured to detect a current location for the aircraft;
   a memory component configured to store a set of aircraft specifications;
   a controller configured to, when actuated, generate a plurality of instructions for an operator of the aircraft, wherein the set of instruction comprise instructions for controlling the aircraft during an approach and landing, and wherein the plurality of instructions are generated based on the detected current location and the stored aircraft specifications;
   a display component configured to receive an indication of each of the plurality of instructions from the controller, and present each of the received indications to the operator, wherein at least the display component comprises a personal computing device; and
   a mount configured to support the personal computing device within the aircraft.

8. The device of claim 7, wherein at least the navigation component comprises an avionics system integrated into the aircraft.

9. The device of claim 7, wherein the controller is configured to generate the plurality of instructions based at least in part on a detected flight parameter.

10. A method for providing landing instructions, comprising:

detecting, utilizing a navigational system, a current location of an aircraft;

selecting a landing location for the aircraft;

providing a sequence of approach instructions for executing an approach sequence;

providing a sequence of landing instructions for executing a landing sequence, wherein the provided instructions comprise a controller selecting custom indications based on specifications for the aircraft and presenting the custom indications to an operator of the aircraft; and providing a sequence of shutdown instructions for shutting down an aircraft.

11. The method of claim 10, and further comprising:
providing instructions for establishing communication with an air traffic control.

12. The method of claim 10, wherein providing instructions comprises:
detecting a flight parameter for the aircraft;
comparing the detected flight parameter to a threshold flight parameter; and
providing, upon detection that the detected flight parameter is outside an acceptable parameter range, an indication to the operator.

13. The method of claim 10, wherein the provided indication comprises instructions for addressing the detected flight parameter to the operator.

14. The method of claim 10, wherein the navigational system comprises a global positioning system.

15. The method of claim 10, wherein selecting a landing location comprises:
detecting a plurality of potential landing locations within a proximity of the detected current location;
ranking the plurality of potential landing locations based on an estimated flight distance from the detected current location;
presenting a landing location to the operator based on the ranking of potential landing locations; and
wherein potential landing locations are removed from the ranking of potential landing locations based at least in part on the specifications for the aircraft.

16. The device of claim 7, wherein at least one of the generated plurality of instructions are provided audibly.

17. The device of claim 7, and further comprising an altitude component configured to detect a current altitude of the aircraft.

18. The device of claim 7, and further comprising a speed component configured to detect a speed of the aircraft.

* * * * *